(12) United States Patent
Jmaev

(10) Patent No.: US 8,941,315 B2
(45) Date of Patent: Jan. 27, 2015

(54) METHOD AND APPARATUS FOR SYNCHRONOUS SINE WAVE DIMMING OF LUMINARIES

(76) Inventor: Jack Ivan Jmaev, Chino, CA (US)

( * ) Notice: Subject to any disclaimer, the term of this patent is extended or adjusted under 35 U.S.C. 154(b) by 0 days.

(21) Appl. No.: 13/261,575

(22) PCT Filed: Jul. 26, 2011

(86) PCT No.: PCT/US2011/001338
§ 371 (c)(1),
(2), (4) Date: Jan. 26, 2013

(87) PCT Pub. No.: WO2012/018376
PCT Pub. Date: Feb. 9, 2012

(65) Prior Publication Data
US 2013/0181634 A1    Jul. 18, 2013

Related U.S. Application Data

(60) Provisional application No. 61/400,440, filed on Jul. 27, 2010, provisional application No. 61/456,304, filed on Nov. 3, 2010.

(51) Int. Cl.
*H05B 37/02* (2006.01)
*G05F 1/24* (2006.01)
*H05B 41/38* (2006.01)

(52) U.S. Cl.
CPC *G05F 1/24* (2013.01); *H05B 41/38* (2013.01); *H05B 37/02* (2013.01)
USPC ........... 315/226; 315/247; 315/287; 315/308; 315/360; 323/207

(58) Field of Classification Search
CPC ........ H05B 37/02; H05B 39/02; H05B 39/04; H05B 41/14; H05B 41/36
USPC ............. 315/209 R, 226, 247, 283, 287, 291, 315/308, 360; 323/206, 207, 220; 388/907, 388/921
See application file for complete search history.

(56) References Cited

U.S. PATENT DOCUMENTS

| | | | | |
|---|---|---|---|---|
| 5,917,312 | A * | 6/1999 | Brkovic | 323/282 |
| 7,642,762 | B2 * | 1/2010 | Xie et al. | 323/282 |
| 8,283,901 | B2 * | 10/2012 | Lopata et al. | 323/224 |

* cited by examiner

*Primary Examiner* — Thuy Vinh Tran
(74) *Attorney, Agent, or Firm* — Jack Jmaev

(57) ABSTRACT

A luminary dimming system having a three terminal dimming unit. The dimming unit includes a power controller and a receiver and is responsive to dimming directives received by the receiver. The power controller controls a buck switch and a freewheel switch in a manner that allows reduction of alternating current voltages. Such voltage reduction is accomplished in a manner that preserves the waveform of the source voltage and the power factor exhibited by the luminary.

6 Claims, 28 Drawing Sheets

POSITIVE CURRENT CASE

METHOD AND APPARATUS FOR SYNCHRONOUS SINE WAVE DIMMING OF LUMINARIES

RELATED APPLICATIONS

The present application claims priority to U.S. provisional patent application No. 61/400,440, filed on Jul. 27, 2010 by Jack J'maev entitled "Method and Apparatus for Synchronous Sine Wave Dimming of Luminaries" which is incorporated herein by reference in its entirety; the present application also claims priority U.S. provisional patent application No. 61/456,304, filed on Nov. 3, 2010 by Jack J'maev entitled "Method and Apparatus for Synchronous Sine Wave Dimming of Luminaries" which is incorporated herein by reference in its entirety, to such extent as allowed by law.

BACKGROUND

Over the years, there has been a continuing need for variable output AC power sources. Application of such variable output AC power sources includes driving reactive loads. Some examples of such reactive loads include electric motors, ballasts for discharge-based lighting (e.g. high-pressure sodium vapor luminaries that may be used in street lighting) and other various types of applications. Because of the pressing need for a variable output AC power source, a wide range of solutions has been developed ranging from auto transformers to sophisticated pulse width modulated (PWM) power controllers. It is in this prior-art rich environment that the present method and apparatus is distinguished in terms of its ability to deliver substantially pure sinusoidal power to such reactive loads at higher levels of efficiency.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
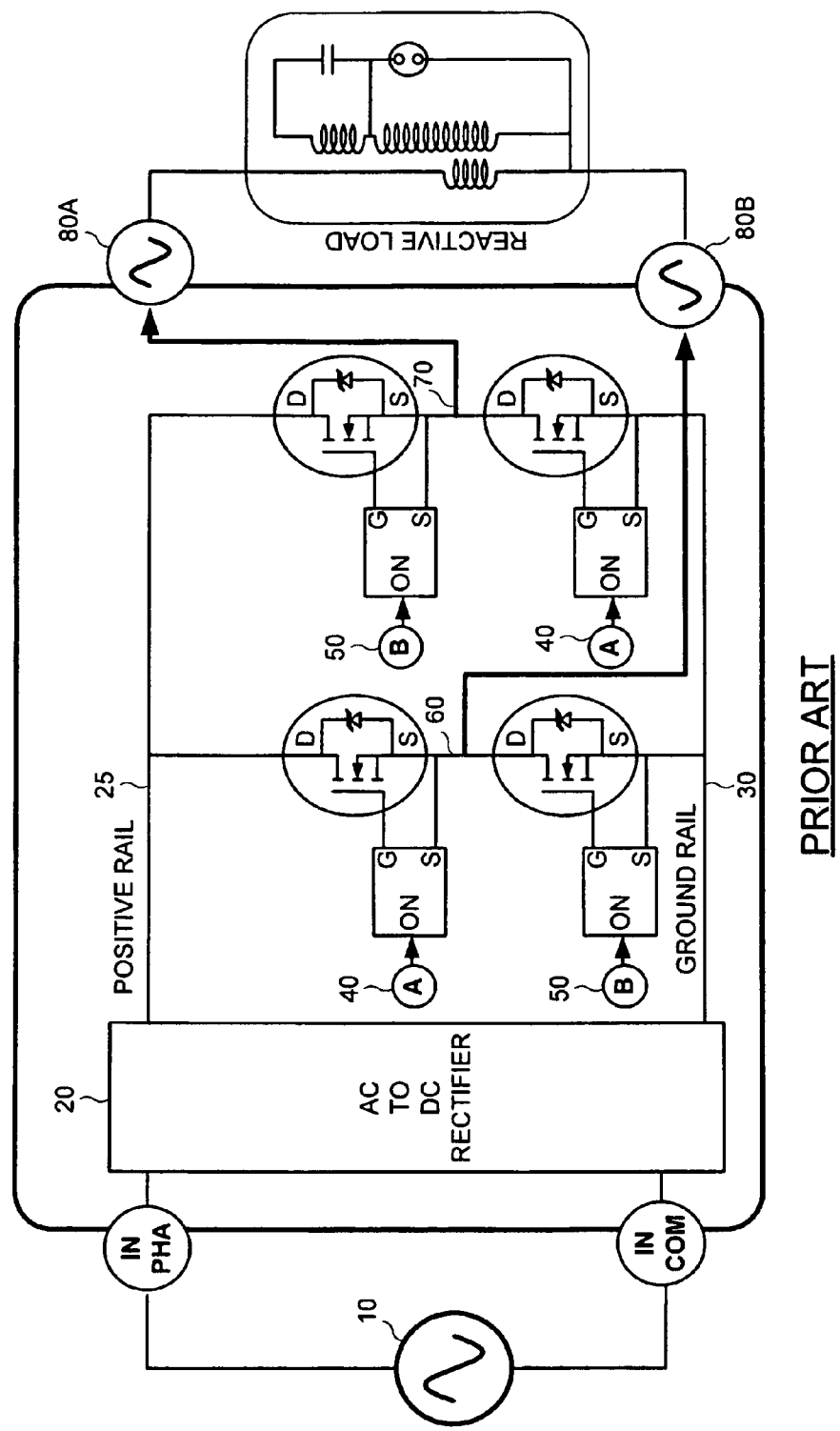
FIG. 1 is a pictorial illustration that depicts a prior art "H" bridge power controller.

FIG. 1 is a pictorial illustration that depicts a prior art "H" bridge power controller. The "H" bridge power controller is amongst recent prior art enabled by high-performance semiconductor switching elements. Such switching elements include, but are not limited to MOSFETs (metal on silicon field effect transistors) and isolated gate bipolar-junction transistors (IGBTs). In the classic "H" bridge architecture, an AC source 10 is directed to a rectification circuit 20. The rectification circuit 20 converts power from the alternating current source 10 into direct current (DC) voltage. Accordingly, this prior art method and apparatus develops a positive rail 25 and a ground rail 30. Four switching devices, which in this illustrative example are depicted as MOSFETs, are controlled by a pulse width modulation signal having two phases. In the figure presented, phase A (40) and phase B (50) are used to alternatively switch two output nodes (output points 60 and 70) from the positive rail 25 to the ground rail 30. The output points are driven substantially 180 degrees out of phase one from the other. By controlling the pulse width over time, sine waves of different amplitudes may be generated at the output terminals 80A and 80B. It should immediately be appreciated that this configuration of prior art must actively create a sinusoidal waveform at its output by manipulating the pulse width at phase A (40) and phase B (50) so as to generate an output waveform in accordance with a desired amplitude and shape. Accordingly, this form of prior art requires extensive computational processing power. Another disadvantage with this form of prior art is that the H-Bridge requires four terminals in order to provide a variable output AC power source. Two terminals receive the source AC power and two terminals provide output AC power as generated by the waveform shaping, pulse width modulation process.

Figure 2:
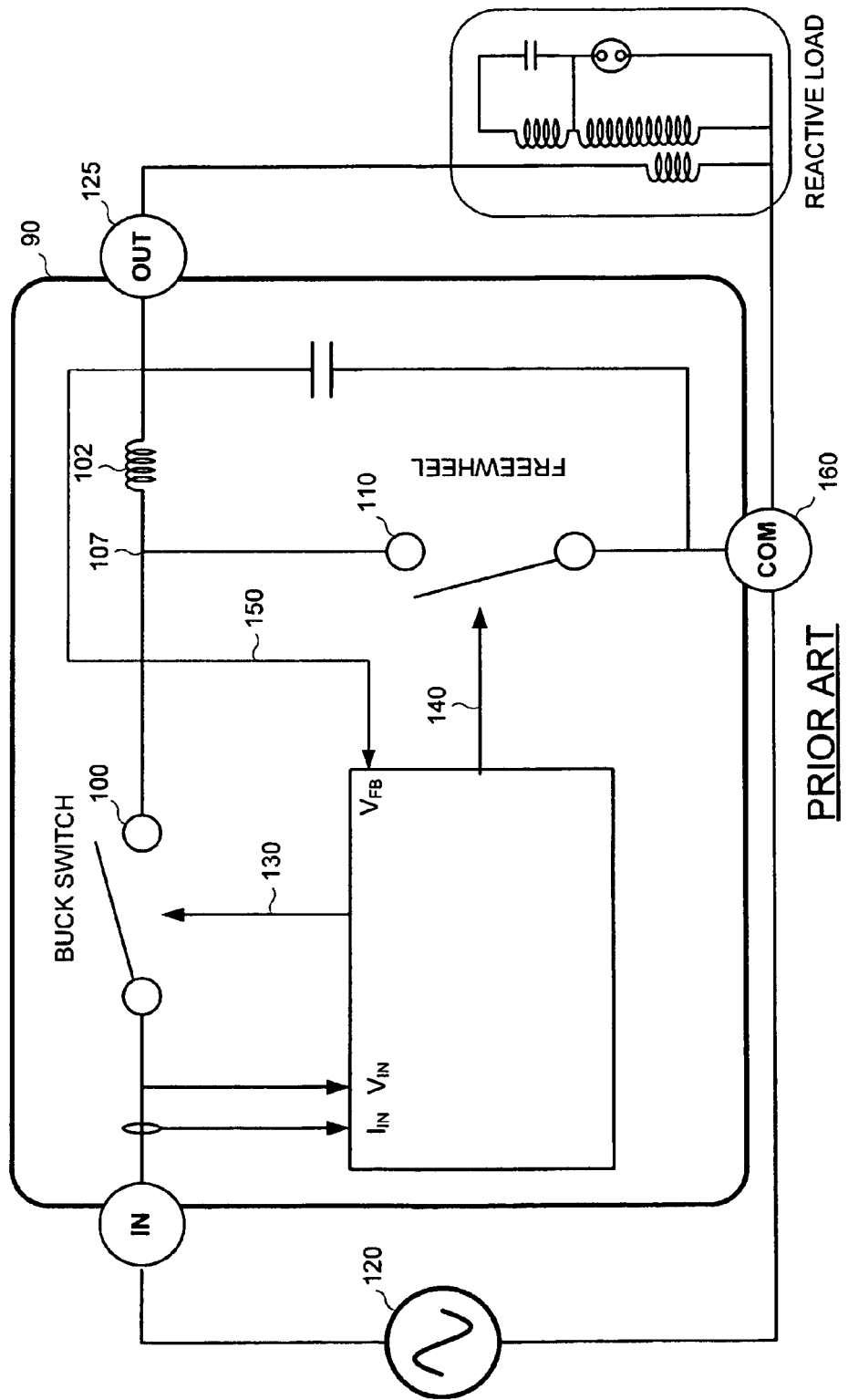
FIG. 2 is a pictorial illustration of a classic prior art synchronous "buck" step-down converter.

FIG. 2 is a pictorial illustration of a classic prior art synchronous "buck" step-down converter. In an ideal situation, the synchronous buck step-down converter 90 includes at least two switches. A first switch 100 is often referred to as the buck switch. A second switch 110 is often referred to as a freewheel switch. In this classic structure, an input source 120 may be either-DC or AC. Accordingly, this structure has often been used as a means for generating reduced voltage AC waveforms. If in fact the buck switch 100 and the freewheel switch 110 were perfect ideal switches, the control signal 130 for the buck switch 100 and the control signal 140 for the freewheel switch 110 would be complements of each other. Voltage feedback 150 could be used to control the duty cycle of the buck control signal 130 in order to control the output voltage 125 provided by the buck voltage step-down converter 90. In many situations, however, the output voltage need only be a reduced version of the input source 120. In these situations, the voltage feedback 150 is not necessary. Simply maintaining the buck control signal 130 at a constant duty cycle will allow the output voltage 125 to vary in accordance with the input waveform provided by the source 120. It should be appreciated that the output waveform will be scaled in amplitude according to the duty cycle of the buck control signal 130. Operation of this classic buck regulator is well known in the art and need not be further described here.

Figure 3:
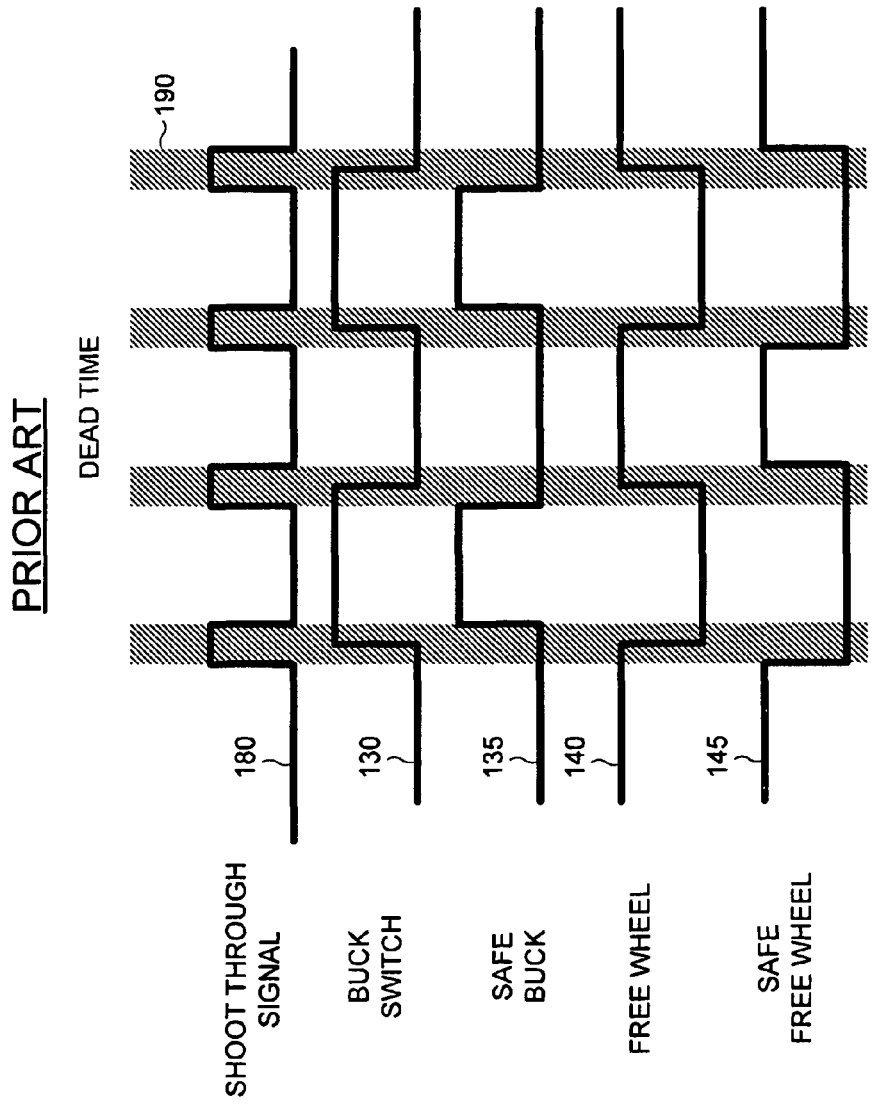
FIG. 3 is a waveform diagram depicting prior art methods directed at a phenomenon known as simultaneous conduction.

FIG. 3 is a waveform diagram depicting prior art methods directed at a phenomenon known as simultaneous conduction. Unfortunately, ideal switches don't seem to exist in the real world. Furthermore, process variations and other errors in the control circuitry depicted in FIG. 2 may cause the buck switch 100 and the freewheel switch 110 to be switched on contemporaneously. This situation would generally result in a catastrophic failure because the power from the source 120 is fed directly back via the common terminal 160 when the buck switch 100 and the freewheel switch 110 are both on at the same time. This is the classic case of "simultaneous conduction". As can be seen in FIG. 3, the buck switch control signal 130 and the freewheel control signal 140 are complements of each other. In this illustration, the duty cycle of the buck switch control signal 130, in this example, is substantially equal to 50 percent. As readily known in the prior art, as the duty cycle of the buck switch control signal 130 is increased, the duty cycle of the freewheel control signal 140 is proportionately decreased. In order to prevent simultaneous conduction, a shoot through signal 180 is typically developed in order to provide for a dead time 190.

By using the shoot through signal 180 to qualify the buck switch control signal 130 and to also qualify the freewheel switch control signal 140, a safe buck control signal 135 and a safe freewheel control signal 145 are developed. As is well known in the prior art, this dead time precludes simultaneous conduction by ensuring that the buck switch 100 and the freewheel switch 110 are not switched on at the same time. However, those skilled in the art will immediately recognize that this "dead time" results in a discontinuity of current flow in the buck inductor 102 depicted in FIG. 2. And, those skilled in the art will also recognize that such discontinuity of current flow in the buck inductor 102 results in voltage spiking at node 107, which is the worst possible place in the topology of this prior art in that it subjects semiconductor switches to high-voltage kick-back from the inductor. Such nigh voltages can result in catastrophic failure of semiconductor switches. Node 107 is the common node that connects the buck switch 100, the freewheel switch 110 and the buck inductor 102 to each other.

Figure 4:
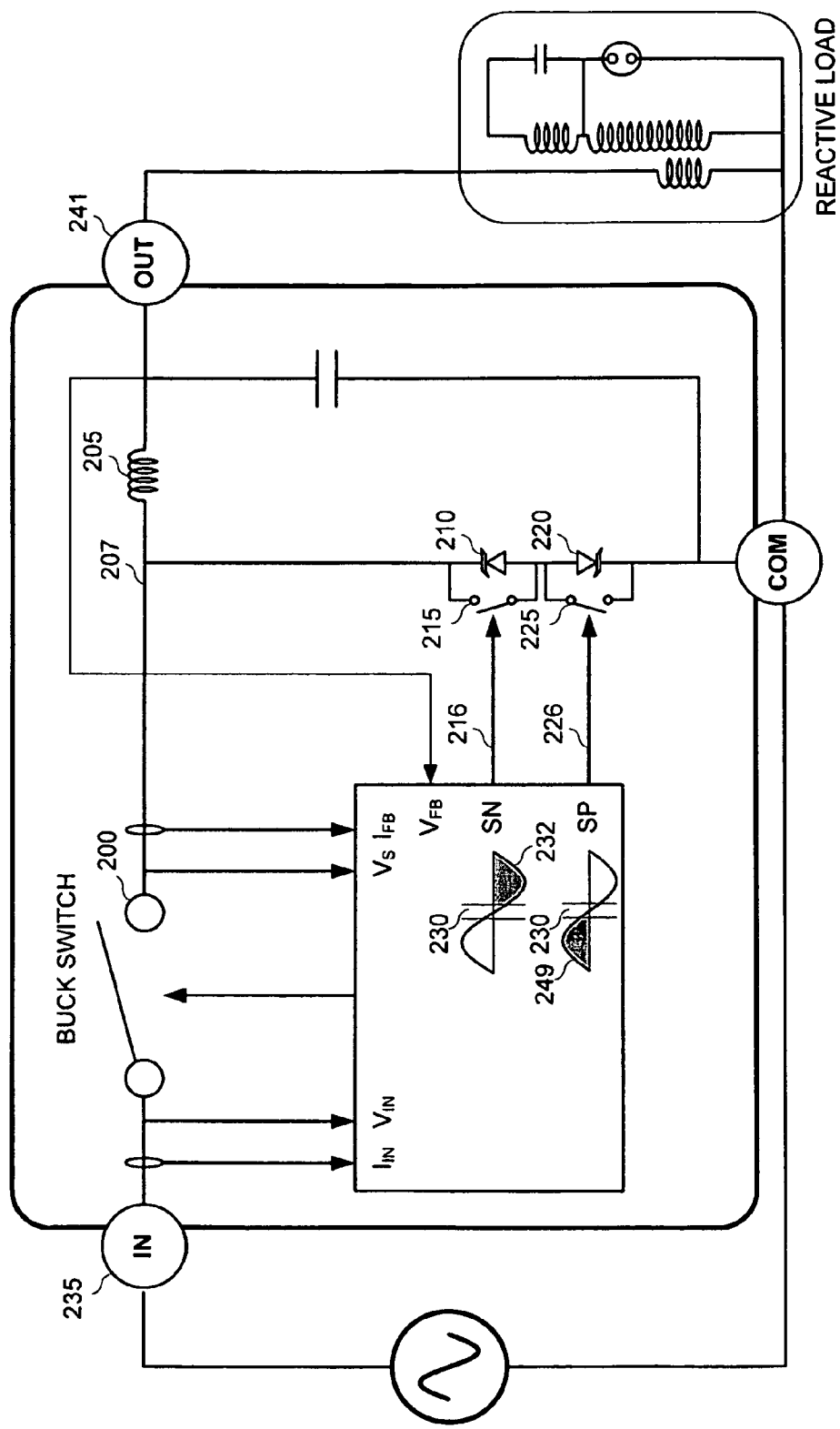
FIG. 4 is a pictorial representation of a prior art AC buck down-converter which utilizes diodes in order to help reduce the dead time needed to preclude simultaneous conduction.

FIG. 4 is a pictorial representation of a prior art AC buck down-converter which utilizes diodes in order to help reduce the dead time needed to preclude simultaneous conduction. In this prior art method and apparatus, two diodes 210 and 220 are placed "back-to-back", i.e. with their anodes connected to each other. The cathode of one diode 210 is connected to the buck switch 200 and to the buck inductor 205 (i.e. node 207). This diode is referred to as the positive freewheel because it allows current to continue to flow through the buck inductor 205 when the buck switch 200 is turned off and the input voltage 235 is greater than the voltage at the common terminal 240. The second diode 220, referred to as the negative freewheel diode, is disposed such that its cathode is connected to the common terminal 240. The negative freewheel diode conducts current from the buck inductor 205 back to the common terminal 240 when the buck switch is turned off and the input voltage 235 is less than the voltage at the common terminal 240.

Two switches 215 and 225 are used to connect across one or the other of the diodes 210 and 220 based on the voltage of the input terminal 235 relative to the common terminal 240. When the input voltage is greater than the common terminal 240 (249), then the switch 225 across diode 220 (the negative freewheel diode) is engaged. This allows freewheel current to bypass the negative freewheel diode 220 and flow through the positive freewheel diode 210 when the buck switch 200 is turned off. In a similar manner, when the input voltage at the input terminal 235 is less than the voltage at the common terminal 240 (232), the switch 215 across the positive freewheel diode 210 is engaged and the freewheel current bypasses the positive freewheel diode 210 and is then allowed to flow through the negative freewheel diode 220. The problem with this prior art circuit is the ambiguity 230 associated with determining if the input voltage is less than or greater than the voltage at the common terminal 240. During this period of ambiguity, if the wrong switch (215 or 225) is engaged, there is a potential for inducing a discontinuity in the current flow of the buck inductor 205. This results in the usual high-voltage spike at node 207. Those skilled in the are will appreciate that this high voltage spiking is caused by the back-driven electro-motive-force (EMF) stored in the buck inductor 205. Such high voltage spiking can irreparably damage semiconductor switches which are often used in the position of the buck switch 200 and the diodes used to maintain freewheeling current in the inductor 205.

Figure 5:
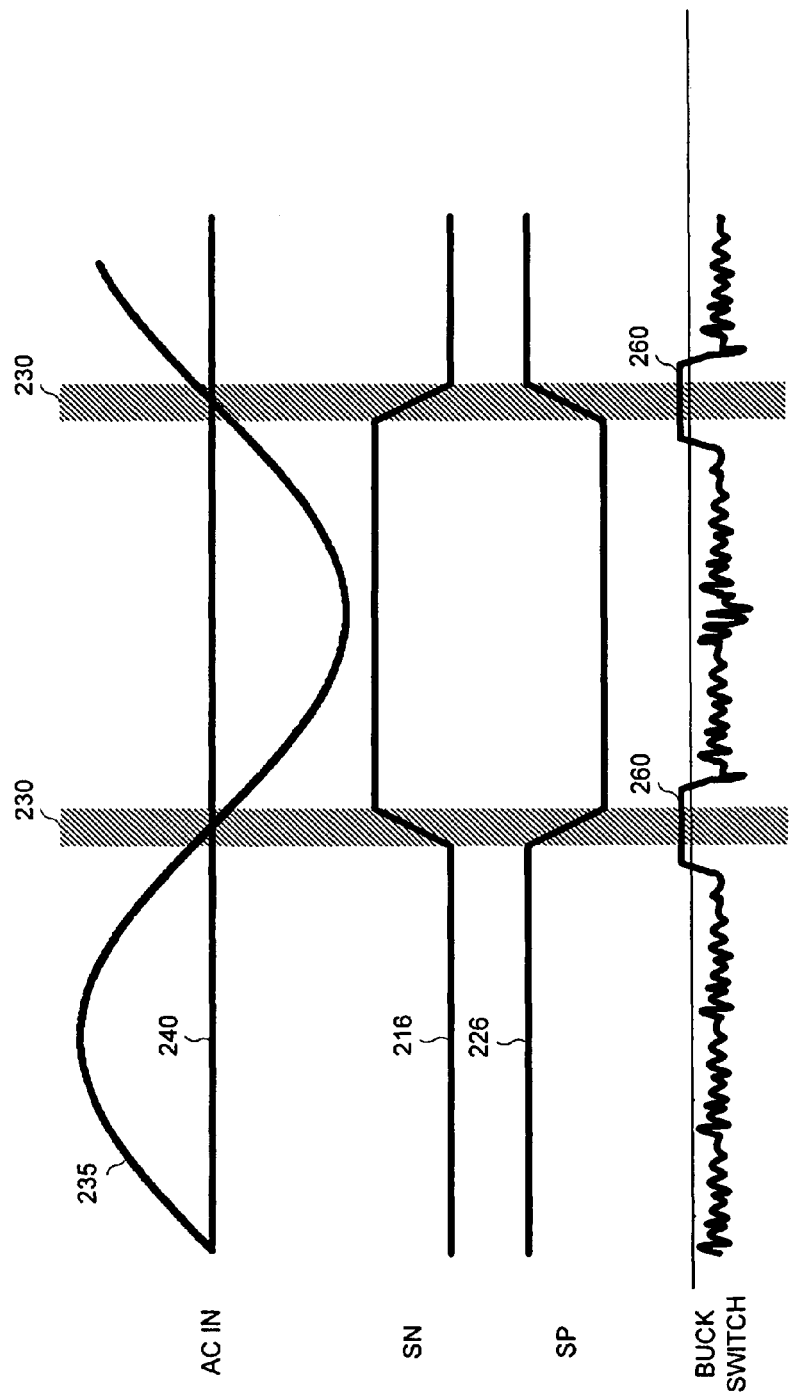
FIG. 5 is a timing diagram that depicts the control of switches across back-to-back diodes used in one form of a prior art AC buck down-converter.

FIG. 5 is a timing diagram that depicts the control of switches across back-to-back diodes used in one form of a prior art AC buck down-converter. As can be seen; two switching signals, switch N (SN) and switch P (SP), which are depicted as items 216 and 226 in FIGS. 4 and 5, alternately enable switches 215 and 225 in order to enable freewheel current to flow through diode 210 or diode 220 based on the polarity of the input AC voltage at the input terminal 235 relative to the common terminal 240. In order to compensate for the ambiguity 235 in determining the polarity of the AC signal, it is necessary to discontinue 260 the function of the buck switch 200 by allowing it to be enabled (i.e. turned on) during the period of ambiguity 230. The freewheel switches are turned of during this time. This results in deformation and unwanted harmonics in the output waveform delivered to the output terminal 241 (in FIG. 4).

Figure 6:
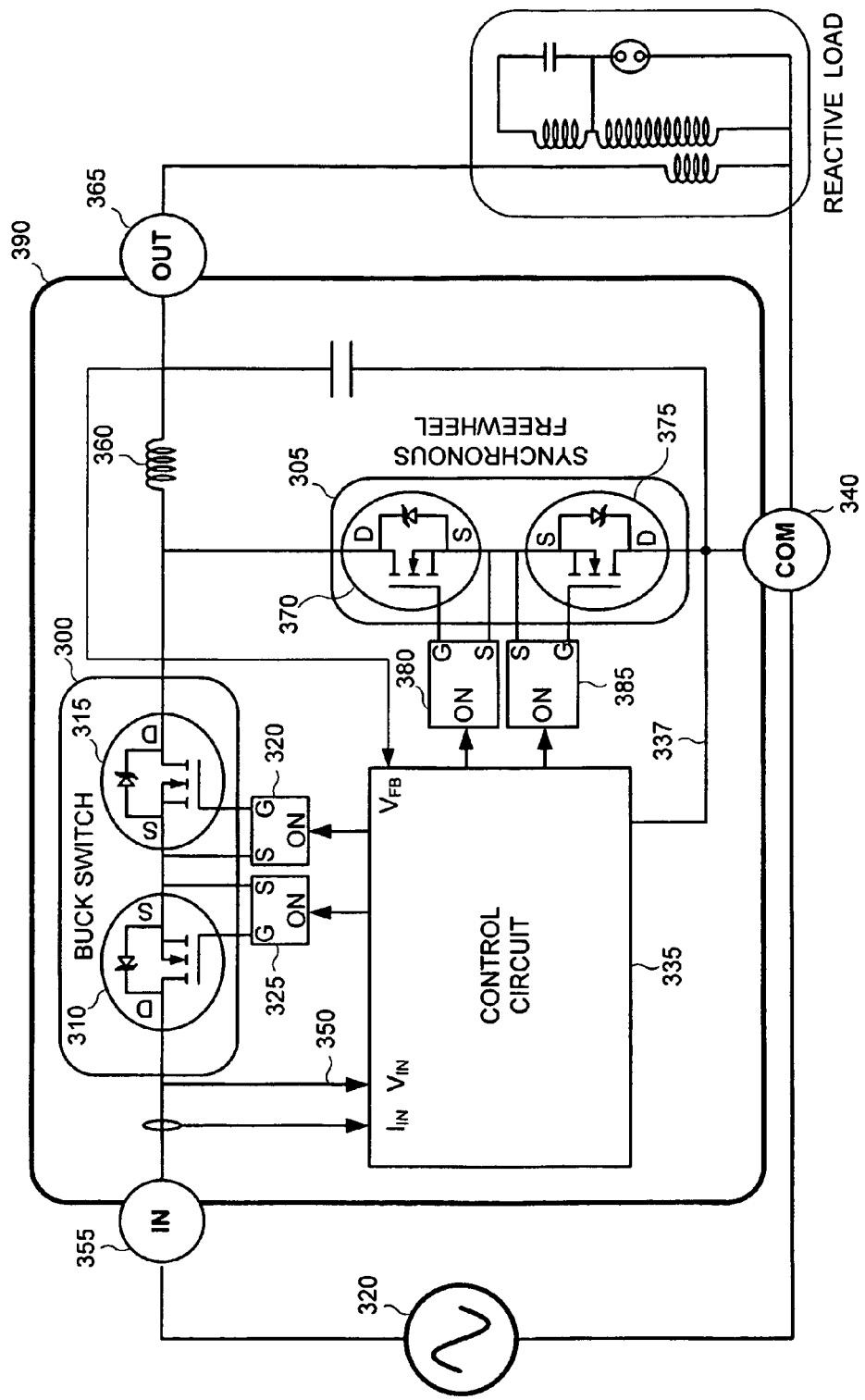
FIG. 6 is a pictorial representation of a present art embodiment of an AC buck down-converter.

FIG. 6 is a pictorial representation of a present art embodiment of an AC buck down-converter. Today, the shortcomings of prior art AC buck down-converter topologies have been overcome. In this example method and embodiment, semiconductor devices are used for bi-directional switching of current in both the buck switch position 300 and the freewheel position 305. It should further be appreciated that the current state of the art embodies a synchronous freewheel mechanism. In this example method and embodiment, the buck switch 300 comprises two semiconductor switches, for example two MOSFETs. A first MOSFET 310 is disposed so as to receive the input AC waveform 320 at its drain terminal. The source of this first MOSFET 310 is electrically connected to a source terminal of a second MOSFET 315 that is also included in the buck switch 300. The drain of this second MOSFET 315 comprises the output of the buck switch 300 and is connected to the buck inductor 360 and the freewheel switch 305. In this example method and embodiment, buck control is accomplished by MOSFET gate drivers 320, 325. It should be appreciated that these gate drivers comprise "high-side" drivers and include high-voltage isolation between the buck switch 300 and a control circuit 335. In one example embodiment, the signals to control the gate drivers 325 and 320 are substantially identical to each other in terms of timing. This causes both semiconductor switches 310 and 315 to be on of the same time. This results in bi-directional switching of the input current received from the AC source 320.

In this example method and embodiment, the control circuit 335 operates relative (337) to the common terminal 340. Power for the control circuit 335 is derived from the input AC waveform directed (335) to the control circuit. The AC input voltage 350 to the control circuit 335 also enables the control circuit to monitor the polarity of the input voltage AC waveform 320 at the input terminal 355 relative to the common terminal 340. The current topology also includes a buck inductor 360, the output of which is directed to an output terminal 365. This example method and embodiment further comprises a synchronous freewheel switch 305 comprising a third MOSFET 370 and a fourth MOSFET 375. Third and fourth gate drivers 380 and 385 are also "high-side", isolated drivers that are included in this example method and embodiment of the present art buck down-converter 390.

Figure 7:
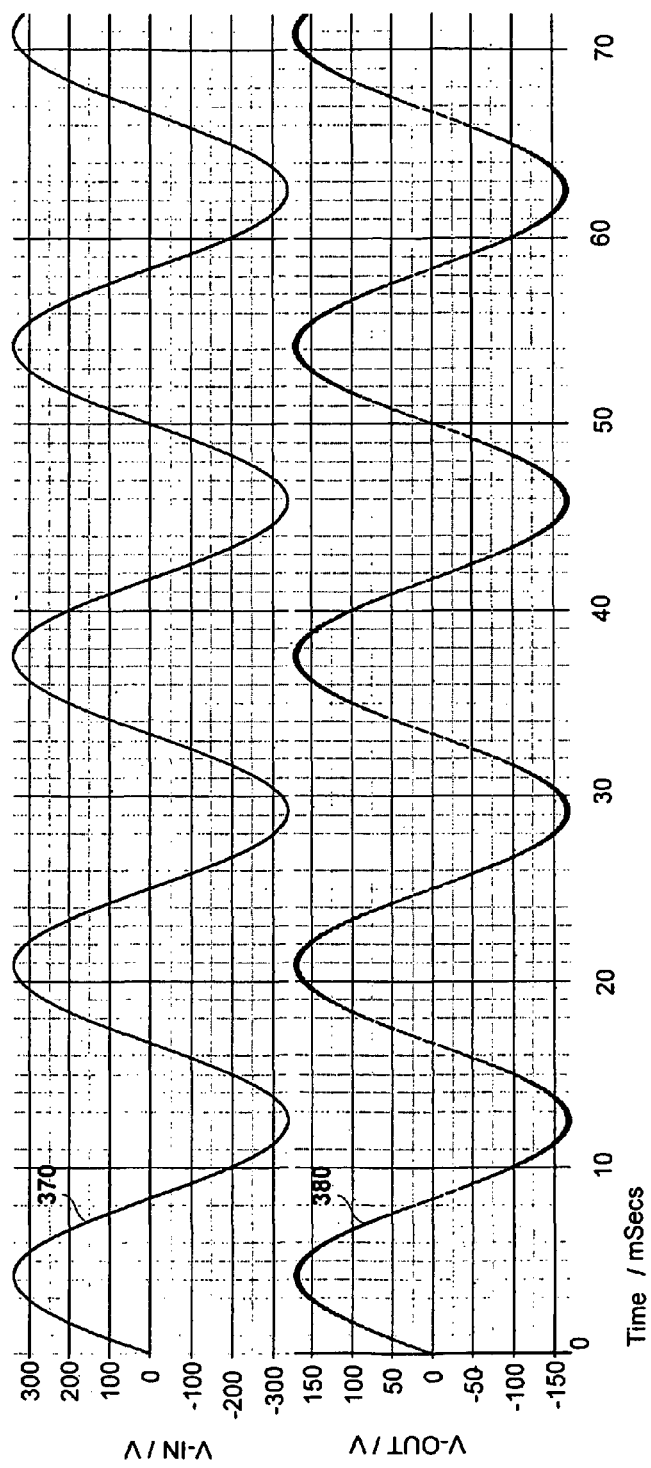
FIG. 7 is a pictorial representation of an input AC waveform and a resulting a AC waveform derived according to the present example method and embodiment of a buck down-converter.

FIG. 7 is a pictorial representation of an input AC waveform and a resulting a AC waveform derived according to the present example method and embodiment of a buck down-converter. It should be appreciated that the current method and embodiment enables substantially true replication of the AC waveform 370 present at the input terminal 355, but at a reduced voltage level 380. The output waveform 380 is reduced in voltage according to the duty cycle applied to the buck switch 300 of the present embodiment. This figure depicts only one example use case wherein the duty cycle applied to the buck switch 300 is substantially equal to 50 percent. It should be appreciated that the buck switch can be operated at any duty cycle and the claims appended hereto or not intended to be limited to any particular example application or operational case of the present method and embodiment.

Figure 8:
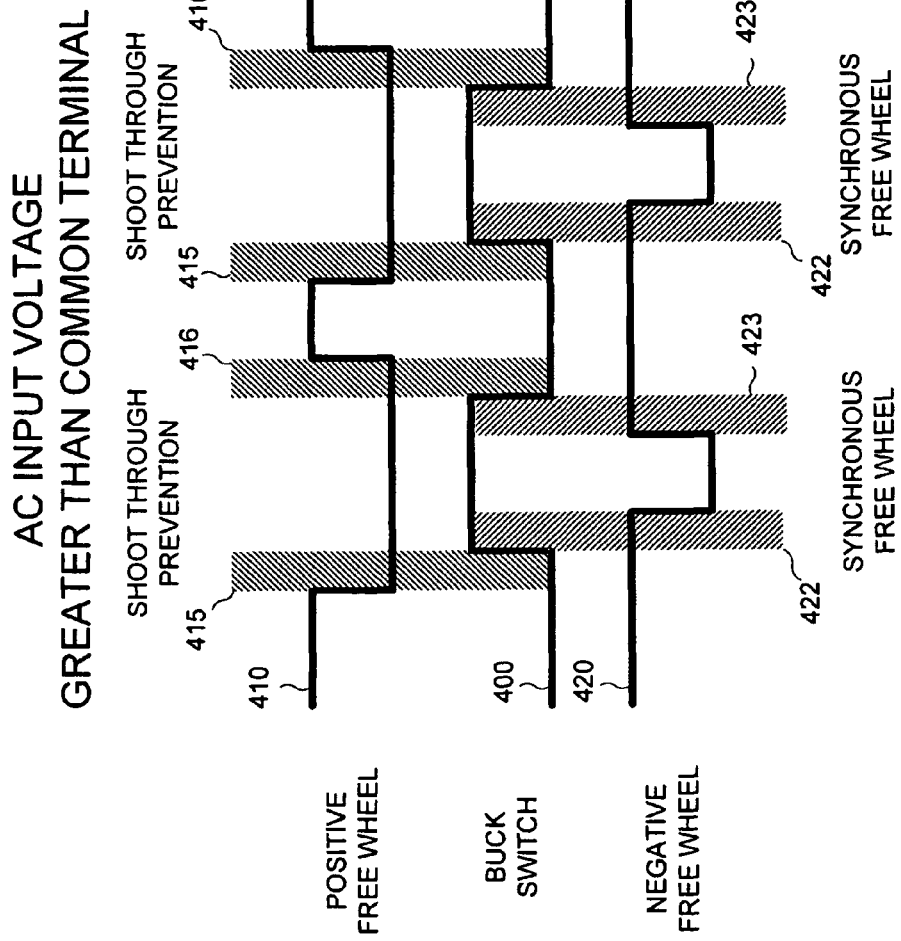
FIGS. 8 and 9 are, respectively, a timing diagram and an operational diagram that depict the manner in which the present art controls the semiconductor switches included in the synchronous freewheel switch when the input voltage is greater than that at the common terminal in a three-terminal buck down-converter.
Figure 9:
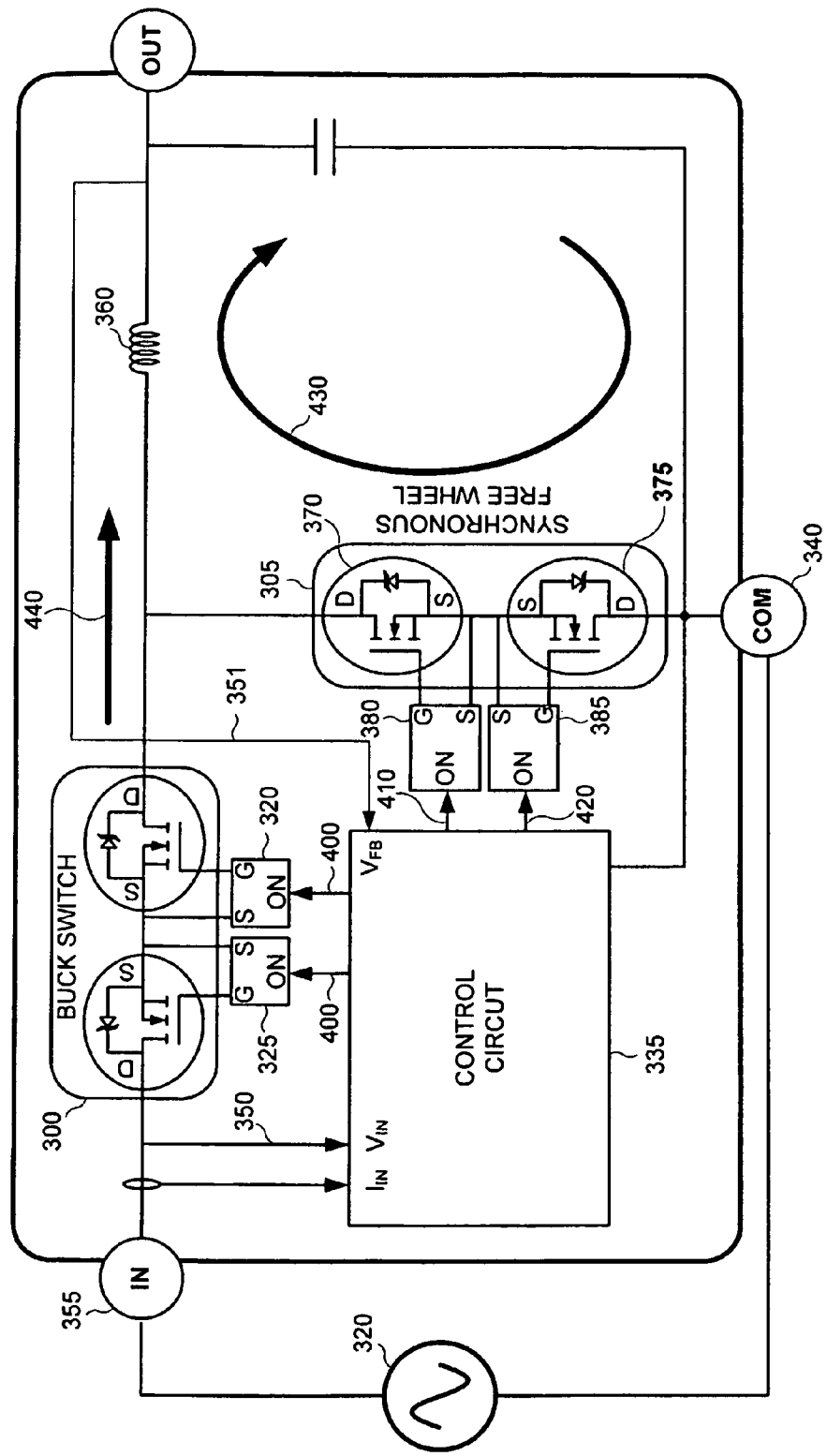

FIGS. 8 and 9 are, respectively, a timing diagram and an operational diagram that depict the manner in which the present art controls the semiconductor switches included in the synchronous freewheel switch when the input voltage is greater than that at the common terminal in a three-terminal buck down-converter. The present method and apparatus are best understood by examining the timing diagram of the buck switch control signal 400 relative to a positive freewheel control signal 410 and a negative freewheel control signal 420. The two semiconductor switches (e.g. MOSFETs) are disposed in a manner such that the source of the third semiconductor switch 370 is electrically connected to the source of the fourth semiconductor switch 375 and the drain of the third MOSFET 370 is electrically connected to the output of the buck switch 300 and to the buck inductor 360. The fourth MOSFET 375 is disposed in a manner wherein the drain of the fourth MOSFET 375 is electrically connected to the common terminal 340.

MOSFET are particularly useful to the present method and apparatus in that they included a parasitic diode within their structure. By connecting the two source terminals of the third and fourth MOSFETs 370, 375, the parasitic diodes in these devices are also placed "back-to-back", i.e. having their anodes electrically connected. Should other types of semiconductor switches be utilized for the synchronous freewheel switch 305, external diodes would need to be provided. In operation, the synchronous freewheel switches 370 and 375 are both turned on when the buck switch 300 is turned off. When the AC input voltage is greater than the common terminal, the synchronous freewheel switch 305 to conducts current from the common terminal 340 through to the buck inductor 360 (path 430). And because both freewheel switches 370 and 375 are turned on, there is significant reduction in power loss because the current, which ordinarily would flow through the parasitic diode (i.e a positive freewheel diode) of MOSFET 370, avoids the diode voltage drop because the MOSFET 370 is itself turned on. This improves overall efficiency in the down-conversion process.

Commensurate with the turn-on and turn-off delays of the buck switch 300 and the synchronous freewheel switch 305, the positive freewheel signal 410, which controls MOSFET 370, is turned off just prior to enabling the buck switch control signal 400. At this point, the freewheel current 430 is allowed to flow through MOSFET 375 by virtue of the fact that MOSFET 375 remains turned on by the negative freewheel control signal 420. The diode across MOSFET 370 continues to carry the current 430 just prior to the point where the buck switch control signal 400 is enabled. After the buck switch control signal 400 is turned off, the positive freewheel signal 410 is again turned on so as to bypass the diode drop of the positive freewheel diode (in MOSFET 370). Accordingly, there is a shoot-through elimination period 415 just prior to enabling the buck switch and just after disabling the buck switch 416. Current is then provided 440 to the buck inductor 360 by the buck switch 300.

The negative free wheel switch 375, which is controlled by the negative free wheel control signal 420 is then turned off just after the buck switch is turned on so as to preclude current 430 from the load entering the circuit from the common terminal 340 where it can interact with the current provided by the buck switch 300. The negative free wheel switch 375 is turned back on just prior to turning off the buck switch in order to bypass the negative free wheel diode included in MOSFET 375 so that the buck inductor 360 does not experience any discontinuity in current flow. This results in bypass of the reverse-biased negative freewheel diode (in MOSFET 375) just after and just before (422, 423) the buck switch is turned on and off, respectively. This is part of the synchronous freewheel mechanism of the present art. By preventing current from the load, which is most probably reactive current that is not in phase with the current provided by the buck switch, from combining with the current provide with the buck switch 300, the power factor of the load as perceived by the AC source 320 remains substantially similar to the inherent power factor exhibited by said load. But for turning off the switch across the negative freewheel diode included in the forth MOSFET 375, the buck down-converter may adversely affect the power factor perceived by the AC source 320. This is merely one advantage of the prior art depicted in FIG. 4.

Figure 10:
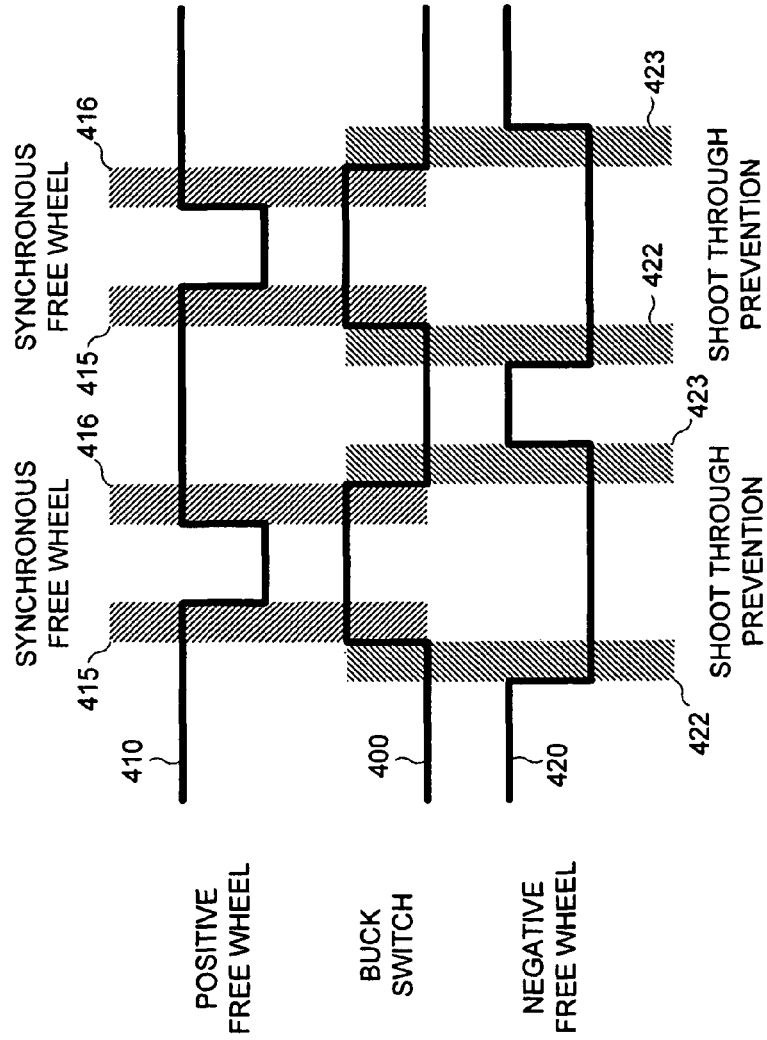
FIGS. 10 and 11 are, respectively, a timing diagram and a operational diagram that depict the manner in which the present art controls the semiconductor switches included in the synchronous freewheel switch when the input voltage is less than that at the common terminal in a three-terminal buck down-converter.
Figure 11:
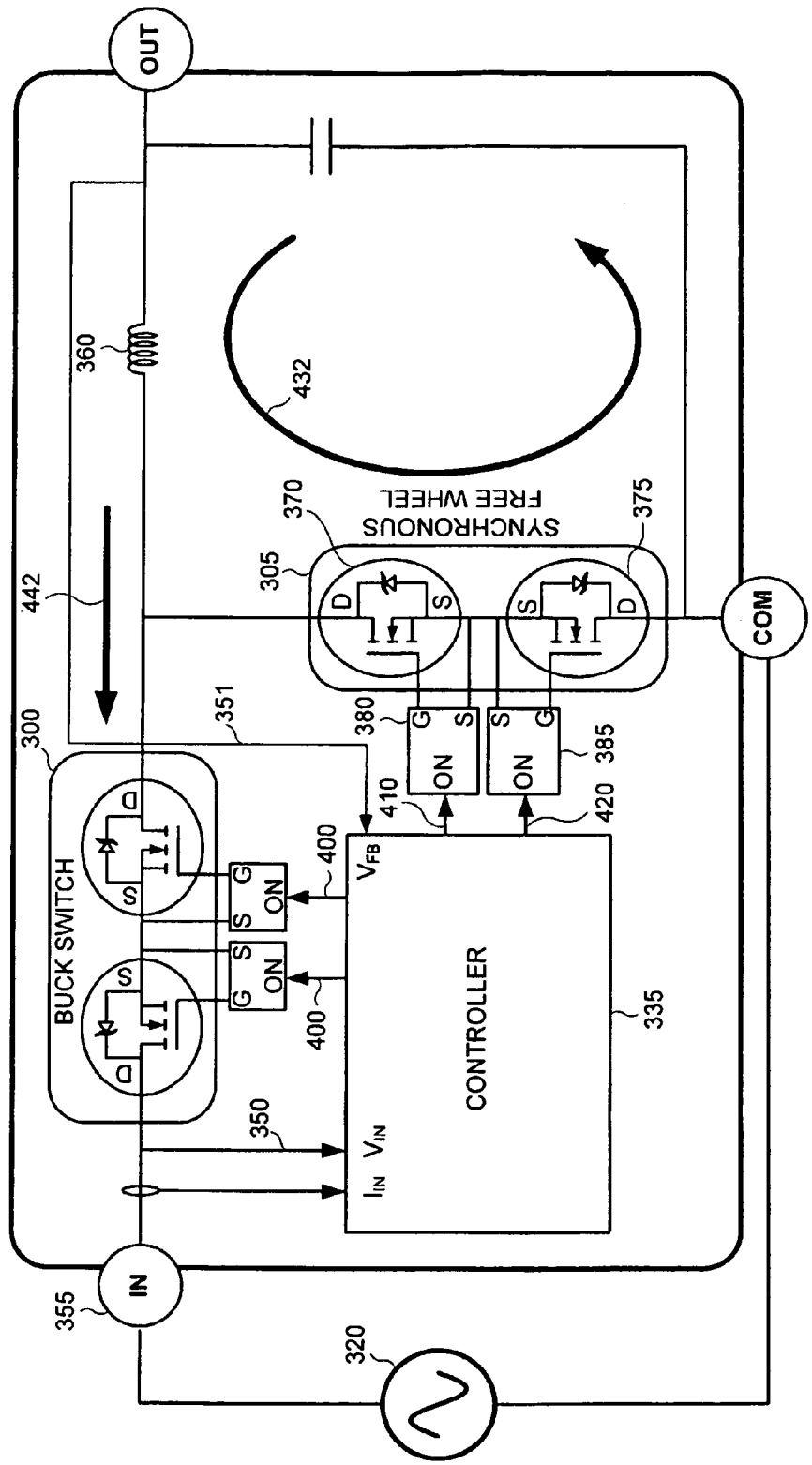

FIGS. 10 and 11 are, respectively, a timing diagram and a operational diagram that depict the manner in which the present art controls the semiconductor switches included in the synchronous freewheel switch when the input voltage is less than that at the common terminal in a three-terminal buck down-converter.

In this state of operation, the synchronous freewheel switches 370 and 375 are both turned on when the buck switch 300 is turned off. When the AC input voltage is less than that at the common terminal 340, this allows the synchronous freewheel switch 305 to conduct current from the buck inductor 360 to the common terminal 340. Again, because both freewheel switches 370 and 375 are turned on, there is significant reduction in power loss because the current, which ordinarily would flow through the parasitic diode (i.e a negative freewheel diode) of MOSFET 375, avoids the diode voltage drop because the MOSFET 375 is itself turned on. This improves overall efficiency in the down-conversion process.

Commensurate with the turn-on and turn-off delays of the buck switch 300 and the synchronous freewheel switch 305, the negative freewheel signal 420, which controls MOSFET 375, is turned off just prior to enabling the buck switch control signal 400. At this point, the freewheel current 432 is allowed to flow through MOSFET 370 by virtue of the fact that MOSFET 370 remains turned on by the positive freewheel control signal 410. The diode across MOSFET 375 continues to carry the current 432 just prior to the point where the buck switch control signal 400 is enabled. After the buck switch control signal 400 is turned off, the negative freewheel signal 420 is again turned on so as to bypass the diode drop of the negative freewheel diode (in MOSFET 375). Accordingly, there is a shoot-through elimination period 422 just prior to enabling the buck switch and just after disabling the buck switch 423. Current is then provided 442 to the buck inductor 360 by the buck switch 300. It should be appreciated that this current is actually pulled back into the AC source 320 because the AC source 320 is in the negative portion of its waveform.

The positive free wheel switch 370, which is controlled by the positive free wheel control signal 410 is then turned off just after the buck switch is turned on so as to preclude current 432 from the load entering the circuit from the common terminal 340 where it can interact with the current provided by the buck switch 300. The positive free wheel switch 370 is turned back on just prior to turning off the buck switch in order to bypass the positive free wheel diode included in MOSFET 370 so that the buck inductor 360 does not experience any discontinuity in current flow. This results in bypass of the reverse-biased positive freewheel diode (in MOSFET 370) just after and just before (415, 416) the buck switch is turned on and off, respectively. This is part of the synchronous freewheel mechanism of the present art. Again, by preventing current from the load, which is most probably reactive current that is not in phase with the current provided by the buck switch, from combining with the current provide by the buck switch 300, the power factor of the load as perceived by the AC source 320 remains substantially similar to the inherent power factor exhibited by said load. But for turning off the switch across the positive freewheel diode included in the forth MOSFET 370, the buck down-converter may adversely affect the power factor perceived by the AC source 320.

FIGS. 11A through 11D depicts an alternative example method and apparatus useful for providing a reduced voltage sine wave to a highly inductive or reactive load. Thus far, the method and apparatus described relied upon controlling the synchronous freewheel switches based on the voltage present at the input terminal in order to determine which freewheeling switch should be engaged in order to maintain constant current flow through the buck inductor. For extremely reactive loads, it is well understood in the art of the voltage and current may be drastically out of phase one from the other. This is represented by a value known as "power factor". When the power factor is at unity (i.e. "1"), and the current and voltage are precisely in phase with each other. However, as power factor decreases, the current flow through the buck inductor may lead or lag the voltage waveform present at the input terminal. Accordingly this alternative method and apparatus address the need to maintain continuous current flow in the buck inductor despite a leading or lagging current waveform relative to the voltage waveform presented to the input of the apparatus.

Figure 11A:
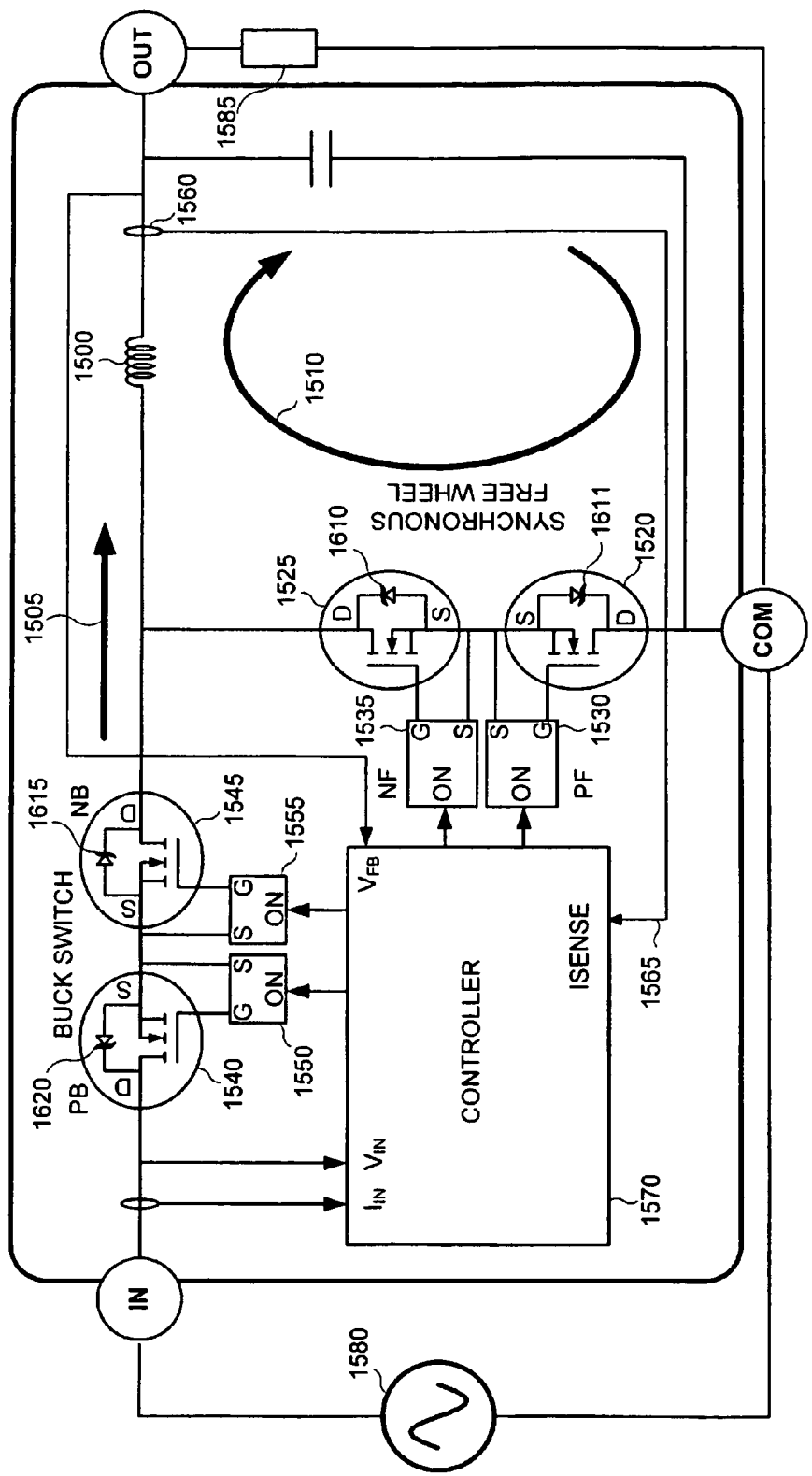
FIGS. 11A and 11B are, respectively, a pictorial diagram and a timing diagram that depicts the operation of one illustrative example method and apparatus when current is flowing in a positive direction through a buck inductor.
Figure 11B:
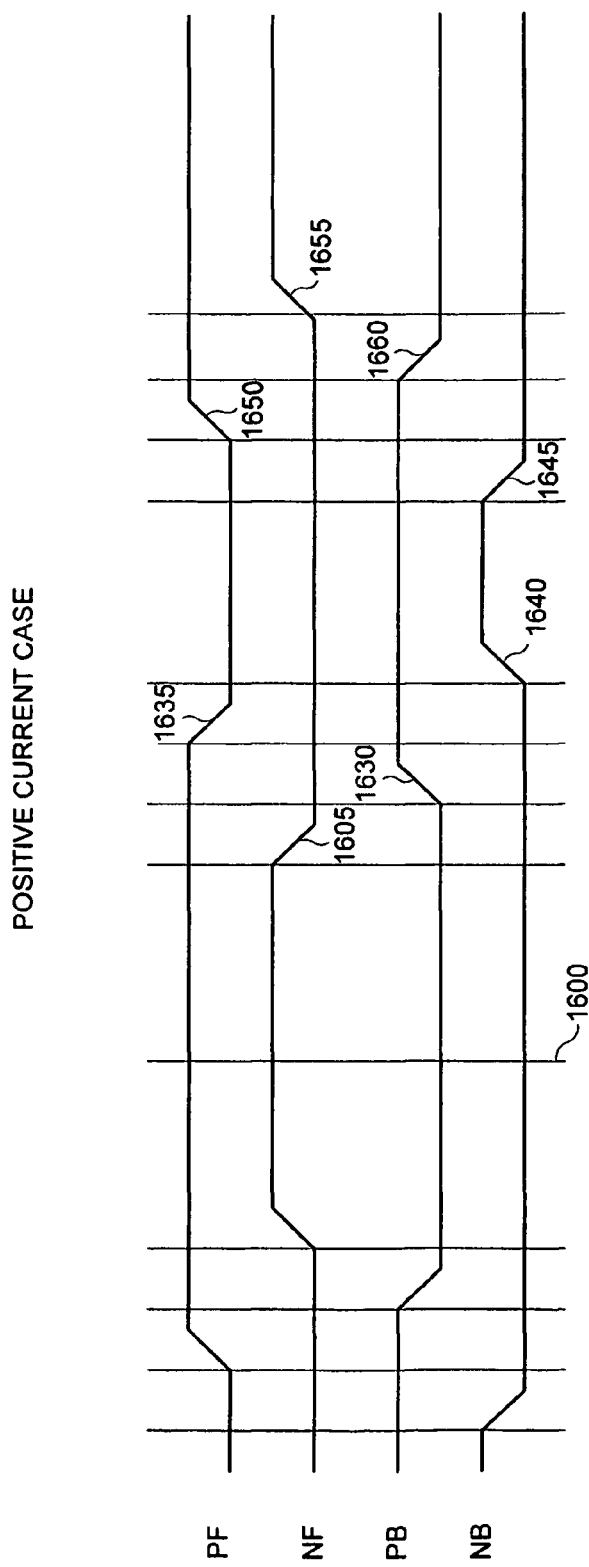

FIGS. 11A and 11B are, respectively, a pictorial diagram and a timing diagram that depicts the operation of one illustrative example method and apparatus when current is flowing in a positive direction through a buck inductor. For the sake of convention, a current will be considered positive when it is flowing into a component, for example the buck inductor 1500. In the case where the load exhibits a very poor power factor, it becomes necessary not only to independently control the synchronous freewheel switches but to also independently control the buck switches. In this illustrative example method and apparatus, the synchronous freewheel comprises two synchronous freewheel switches identified as the positive freewheel "PF" 1520 and in the negative freewheel "NF" 1525. This illustrative method and apparatus, the freewheel switches comprise MOSFET devices disposed in a manner in which the drain of the negative freewheel MOSFET switch 1525 is electrically common to the buck inductor 1500 and buck switch. The positive freewheel MOSFET switch 1520 is disposed in a manner such that its drain terminal is connected to the neutral terminal of the apparatus. The MOSFETs 1520, 1525 forming the freewheel switch are dispose in a manner such that there source terminals are electrically common. This illustrative method and apparatus further comprise gate driving circuit 1530 and 1535 which enable control of the gate terminals of their respective MOSFETs. It should be appreciated that the scope of the claims appended hereto are not intended to be limited in scope to the use of MOSFET switches. Any type of switch may be used, however different types of switches may require the use of two back to back diodes as described earlier in this specification. As has already been pointed out, MOSFETs are a preferred switching device insofar as they include a parasitic diode within their structure and additional back to back diodes are not required as previously described.

In this example method and apparatus, the buck switch comprises two switching devices 1540 and 1545. Unlike the earlier described method and apparatus, in this illustrative method and apparatus the two buck switches are controlled individually. Accordingly the buck switch comprises a positive buck switch "PB" 1540 and a negative buck switch "NB" 1545. Accordingly, each buck switch is controlled by a gate drive circuit, depicted in the figure as 1550 and 1555. In order to maintain constant current flow through the buck inductor 1500, it becomes necessary to add an additional element to the apparatus and an additional step to the method supporting such apparatus. Mainly, an additional step includes sensing the direction of current flow in the buck inductor 1500. Accordingly, this illustrative apparatus further includes a current sensor 1560 which provides current sensing 1565 for the controller 1570. It should be appreciated that the structure of the buck switch in this alternative example method is analogous to the structure of the synchronous freewheel switch described above. In this illustrative example embodiment, the buck switch comprises the positive buck switch 1540 and a negative buck switch 1545 and each of these switches is disposed in parallel with an associated diode 1615 and 1620. Accordingly, the positive buck diode 1620 is disposed with its cathode electrically common with the negative buck switch 1545 and is back-to-back with the negative buck diode 1615 wherein the negative buck diode 1615 is disposed in a manner such that its cathode is electrically common with the positive buck switch 1540. Although the positive buck switch 1540 and the negative buck switch 1545 are depicted in the figure as MOSFETs, any suitable switch may be utilized, however positive and negative buck diodes (1620, 1615) must then be supplied in addition to the switches. As noted numerous times throughout this specification MOSFETs are a preferred device because of the parasitic diode is included in their structure.

This alternative example method and apparatus are best understood through the teachings of the timing diagram (FIG. 11B) that depicts the sequence of switching the synchronous freewheel switches and the buck switches in the case where current is flowing into the buck inductor 1500 from the source 1582 or from the load 1585. In this figure, four control signals are depicted. These include a positive freewheel (PF) control signal 1601, a negative freewheel (NF) control signal 1602, a positive buck control signal 1603 and a negative buck control signal 1604. For the sake of clarity, these signals are depicted as "active high". Considering the situation when the synchronous freewheel switches are both engaged, positive current 1510 flows through the buck inductor 1500 because both the negative freewheel switch 1525 in the positive freewheel switch 1520 are both engaged by means of NF 1602 and PF 1601 control signals. This is illustrated by the timing diagram at point 1600 and it should be appreciated that while both freewheel switches are engaged, both buck switches are turned off (i.e. control signals PB 1603 and NB 1604 are low) as depicted in the timing diagram. According to this illustrative method and apparatus, switching from the freewheel state to the buck state occurs in a particular manner based upon the direction of current flowing through the buck inductor 1500. This current is flowing 1510 through the synchronous freewheel switches, the current must flow through the buck inductor 1500 because the buck switches are both turned off.

Transitioning to the buck state in this situation comprises a first step of disengaging 1605 the negative freewheel switch 1525. When the negative freewheel switch 1525 is disengaged 1605, it should be appreciated that current 1510 continues to flow through the buck inductor 1500 and is maintained by the negative freewheel diode 1610 which is disposed across the negative freewheel switch 1525 having its cathode electrically common with the buck switch and the inductor. Once the negative freewheel is disabled, it is now safe to engage 1630 the positive buck switch 1540. This allows current 1505 to flow from the source 1580 into the buck inductor 1500 even though the negative buck switch 1615 is still turned off since the diode 1615 disposed across the negative buck switch 1545 allows the current to flow from the source 1580 into the inductor 1500. Given that the current flow is now being carried by the buck switch in a positive direction 1505, the positive freewheel switch 1520 is then disabled 1635. At this point, the negative buck switch 1615 is engaged 1640.

When transitioning from the buck state to the freewheel state in the case where positive current 1505 is flowing into the buck inductor 1500 from the source 1580, the buck switch and freewheel switch elements are controlled in a symmetrical manner relative to the transition to the buck state from the freewheel state. As such, current flowing 1505 from the buck switch must be maintained in order to prevent discontinuous current flow through the buck inductor 1500. Accordingly, the negative buck switch 1545 is turned off 1645. Even though the negative buck switch 1545 is turned off, the diode 1615 disposed across the negative buck switch 1545 continues to allow current to flow from the source 1580 into the buck inductor 1500. The positive freewheel switch 1520 is then turned on 1650. This now enables positively flowing current 1510 to be directed into the buck inductor 1500. However the freewheel current 1510 is not allowed back to the source 1580 because the negative buck switch 1545 is turned off and the current flow is prevented by the diode 1615 that is disposed across the negative buck switch 1545. At this point, the positive buck switch 1540 is turned off 1660. At this point, current is being carried by the diode 1610 disposed across the negative freewheel switch 1525 and by the positive freewheel switch 1520 by virtue of the fact that the positive freewheel switch 1520 has been turned on. Accordingly, the negative freewheel switch 1525 is then turned on 1655, thus completing the transition from the buck state to the freewheel state when current is flowing into the inductor 1500.

Figure 11C:
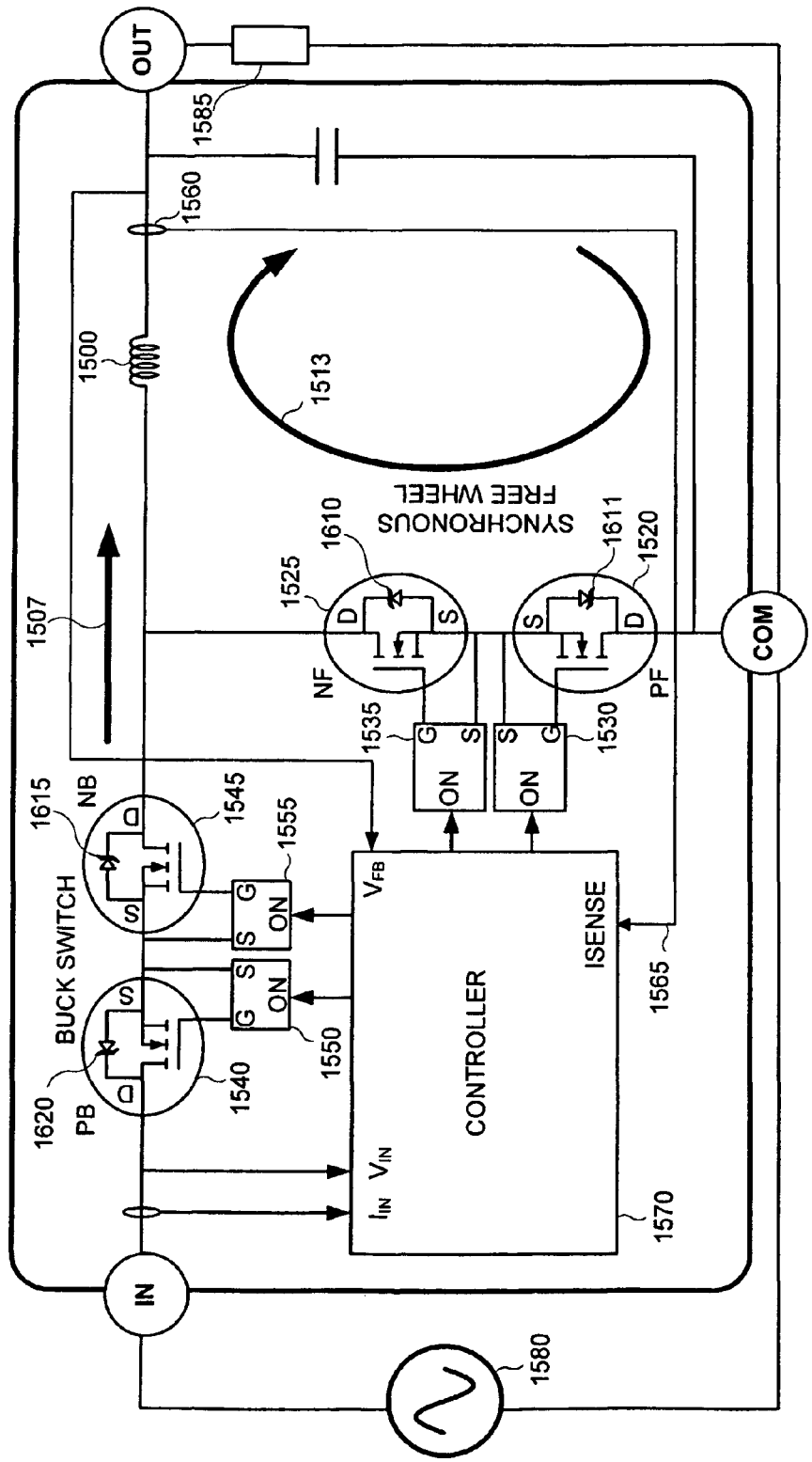
FIGS. 11C and 11D are, respectively, a pictorial diagram and a timing diagram that depicts the operation of one illustrative example method and apparatus when current is flowing in a negative direction through a buck inductor.
Figure 11D:
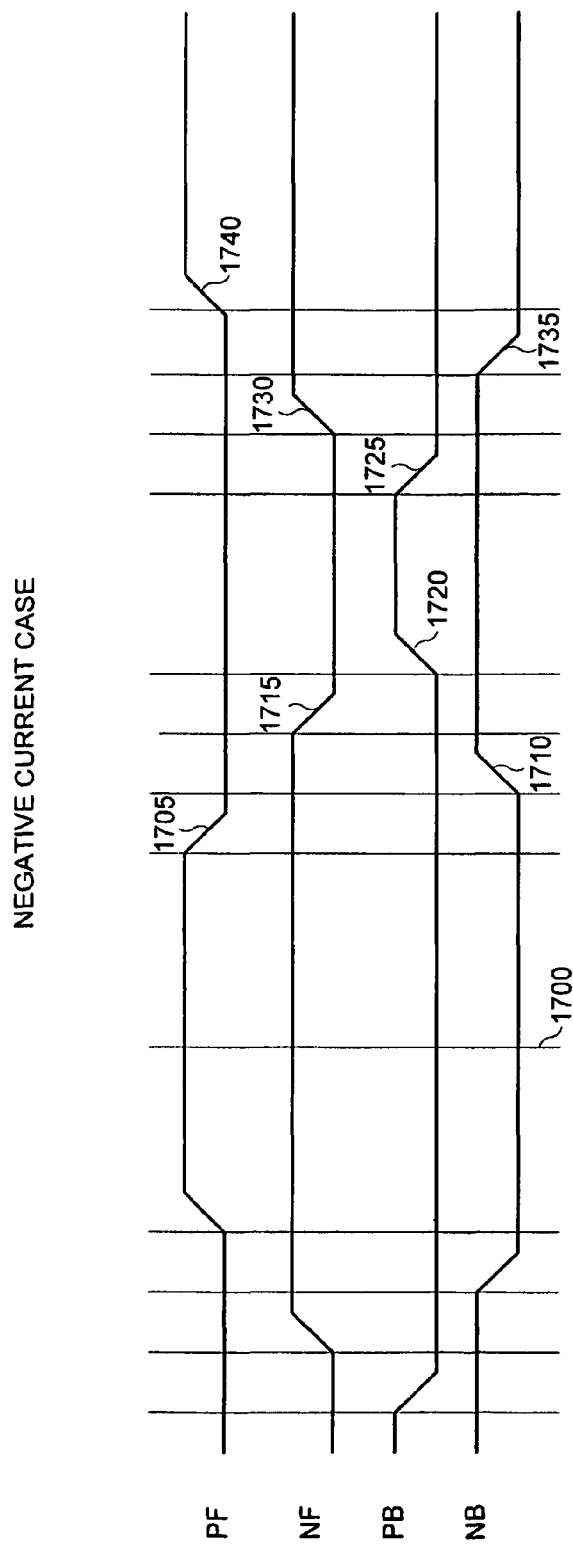

FIGS. 11C and 11D are, respectively, a pictorial diagram and a timing diagram that depicts the operation of one illustrative example method and apparatus when current is flowing in a negative direction through a buck inductor. In this illustrative example method, study of the timing diagram (FIG. 11D) depicts the sequence for controlling the positive buck switch 1540, the negative buck switch 1545, the positive freewheel switch 1520 and the negative freewheel switch 1525. For the sake of comprehension, it is best to examine the state of current flow during a freewheeling state depicted in the figure at point 1700. At this point, both of the freewheel switches are enabled and both of the buck switches are disabled. According to this illustrative use case, freewheel current 1513 is flowing out of the inductor 1500 and down through the synchronous freewheel switches comprising the negative freewheel switch 1525 and the positive freewheel switch 1520.

In this state, transitioning from the freewheel state to the buck state comprises a first step of disabling 1705 the positive freewheel switch 1540. By disabling the positive freewheel switch 1520, the freewheeling current 1513 is maintained because the negative freewheel switch 1525 is still turned on and current flow is maintained by the positive freewheel diode 1611 disposed across the positive freewheel switch 1520. At this point, the negative buck switch 545 is enabled 1710. This now allows current 1507 to start flowing from the buck inductor 1500 back to the source 1580. It should be appreciated that turning on the negative buck switch 1545 allows the current to bypass the diode 1615 disposed across the negative buck switch and continue to be directed to the source 1580 by means of the diode 1620 disposed across the positive buck switch 1540. Once this current path) is established, then the negative freewheel switch 1525 is disabled 1715. In an additional step, once both the positive and negative freewheel switches are disabled, the positive buck switch 1540 is then enabled 1720.

When transitioning from the buck state back to the freewheel state, the switches comprising the buck switch to the synchronous freewheel switch are controlled in a manner symmetrical to the manner in which the switches are controlled when passing from the freewheel state to the buck state. Accordingly, as negative current 1507 is flowing from the buck inductor 1500 back to the source 1580, transitioning to the freewheel state comprises a first step of disabling 1725 the positive buck switch 1540. This allows negative current 1507 to continue back to the source 1580 until the negative freewheel switch 1525 is enabled 1730. At this point the negative freewheel switch 1525 allows current 1513 flowing from the inductor 1500 to pass through the freewheel switch and as should be appreciated to current 1530 is also carried by the diode 1611 disposed across the positive freewheel switch 1520. At this point, the negative buck switch 1545 is disabled 1735. Once both buck switches are off, the positive freewheel switch 1520 is then enabled 1740.

In operation, the controller 1570 determines the direction of current flow by means of the current sensor 1562 disposed so as to enable determination of the direction of current flow in the buck inductor 1500. It should be appreciated that the controller 1570 embodies the methods described herein for controlling the buck switches and the freewheel switches in a manner as described herein based upon the direction of current flowing in the buck inductor 1500. It should be appreciated that the sequence described is best followed as rapidly in succession as allowed by the turn on and turn off delays associated with the positive and negative buck switches and positive and negative freewheel switches. Furthermore, in one illustrative alternative method and apparatus, determination of direction of current flow is accomplished as soon as practical relative to the transition from a buck state to a freewheel state and relative to the transition from a freewheel state to the buck state.

It should also be appreciated that the direction of current flow may change from positive to negative or negative to positive during a buck state or during a freewheel state. Accordingly, even though a particular sequence for controlling the individual buck switches and individual freewheel switches is utilized when entering either a buck state or a freewheel state, an alternative sequence for controlling the individual buck switches and individual freewheel switches is utilized in the event that the direction of current flow changes during the interval of time within a particular buck state or a particular freewheel state. In lay terms, even though the transition from a freewheel state to a buck state follows the sequence for positive current flow, the transition to the alternative state, according to this alternative example method and apparatus, will follow the sequence for transitioning based on negative current flow when such a reversal of current flow is detected during a particular buck state or during a particular freewheel state.

Figure 12:
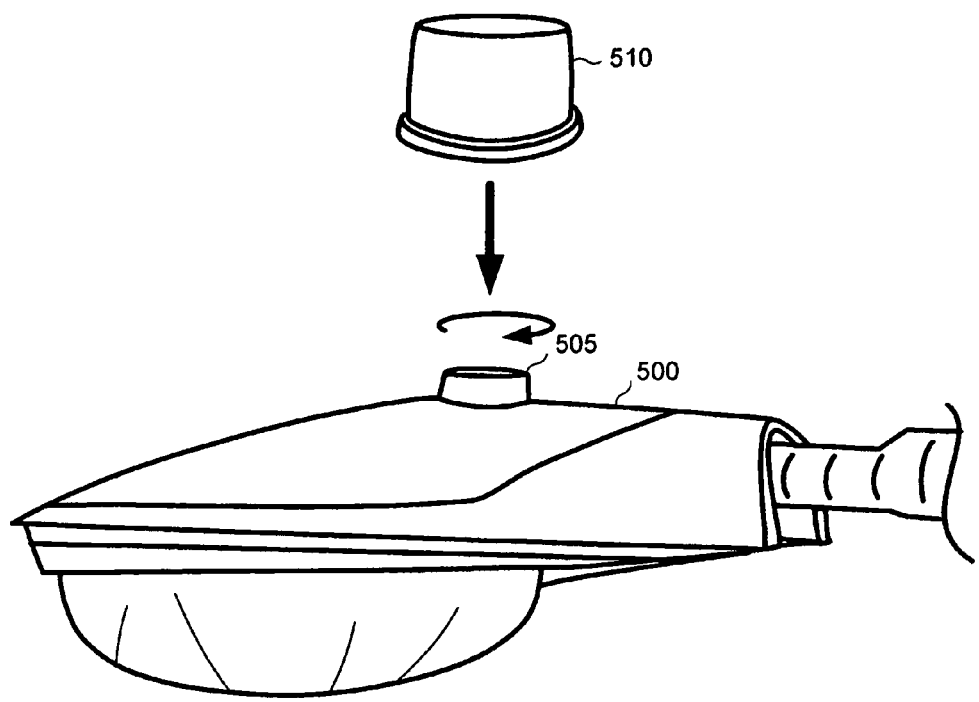
FIG. 12 is a pictorial diagram that depicts application of the present AC buck down-converter for reducing power used by luminaries (e.g. street lights)

FIG. 12 is a pictorial diagram that depicts application of the present AC buck down-converter for reducing power used by luminaries (e.g. street lights). Dimming of street lights is not a new concept, however, the dimming of street lights, which are also referred to as luminaries, has thus far required complex electronic ballasts. The reason that complex electronic ballasts have been required is that prior art three-terminal dimming circuits impacted power factor of the luminaries because these prior art three-terminal devices were not capable of precluding reactive load currents from interacting with the current provided by the buck switch in these prior art technologies. As a result, more complicated topologies, such as the "H"-bridge of prior art that was discussed supra; have been used for dimming reactive loads, including luminaries. And, because the electronic dimming ballast for luminaries employed a four terminal device this required extensive retrofit of the luminary fixture. The costs of such retrofits could not be justified by the power savings that might otherwise be realized by deploying such dimming systems en masse.

Today, the synchronous buck down-converter described herein is able to provide a substantially pure sinusoidal waveforms to the load circuit with little to no perceptible difference in power factor. And, because the buck down-converter of the current method and apparatus is a three terminal device, a luminary 500 can be easily retrofitted. Many luminaries used throughout the world provide a three terminal receptacle 505. The three terminal receptacle 505 is ordinarily used to accept a photocell. In the prior art, the photocell would enable power to a magnetic ballast in the luminary 500 when the ambient light levels fell below a preset threshold. Hence, the luminary would "turn-on" sometime near sunset and "turn-off" sometime near sunrise. In one example of the present method and apparatus, a radio-directed luminary controller 510 is used to replace the photocell. It should be appreciated that there are many different applications of a three terminal AC buck down-converter and the claims appended hereto are not intended to be limited to a simple application such as luminary control.

There are many shortcomings that are inherent in the use of photocells for controlling when a luminary is turned on and when it is turned off. For example, the photocell may react to atmospheric conditions such as heavy fog and allow the luminary to remain on even though the sun had long since breached the horizon. Also, of all things, the photocell structure can be obscured by bird droppings or other debris that may be deposited through adverse weather conditions. These are just two examples of degraded performance of such photocells that has caused many municipalities, states and private operators of luminaries to replace a photocell whenever the light in the fixture is replaced.

The use of radio control has seen some application in luminary control. However, these systems have still been limited to turning on and turning off the luminary at particular times. In these prior art methods, radio directives are received from a central control station and are used to direct the luminary to turn on and turn off at specific times. In these prior art systems, the central control system determines when the luminary should be turned on and when it should be turned off. Then, specific turn-on and turn-off commands are directed to the luminary. There is no autonomous control resident in each of the luminaries and if the central control station goes down, the luminaries must again revert to photocell control.

In some systems, the radio-directed luminary controller receives a time beacon and then uses a photocell to turn-on the luminary, but turns the luminary off later at night by means of a simple timer. For example, one prior art method turns on the luminary at sunset based on a photocell signal. However, because the luminary controller is cognizant of the time, it shuts the luminary off at a pre-established time which is programmed into the radio-directed luminary controller prior to, contemporaneous with or after its installation on the luminary fixture.

Figure 13:
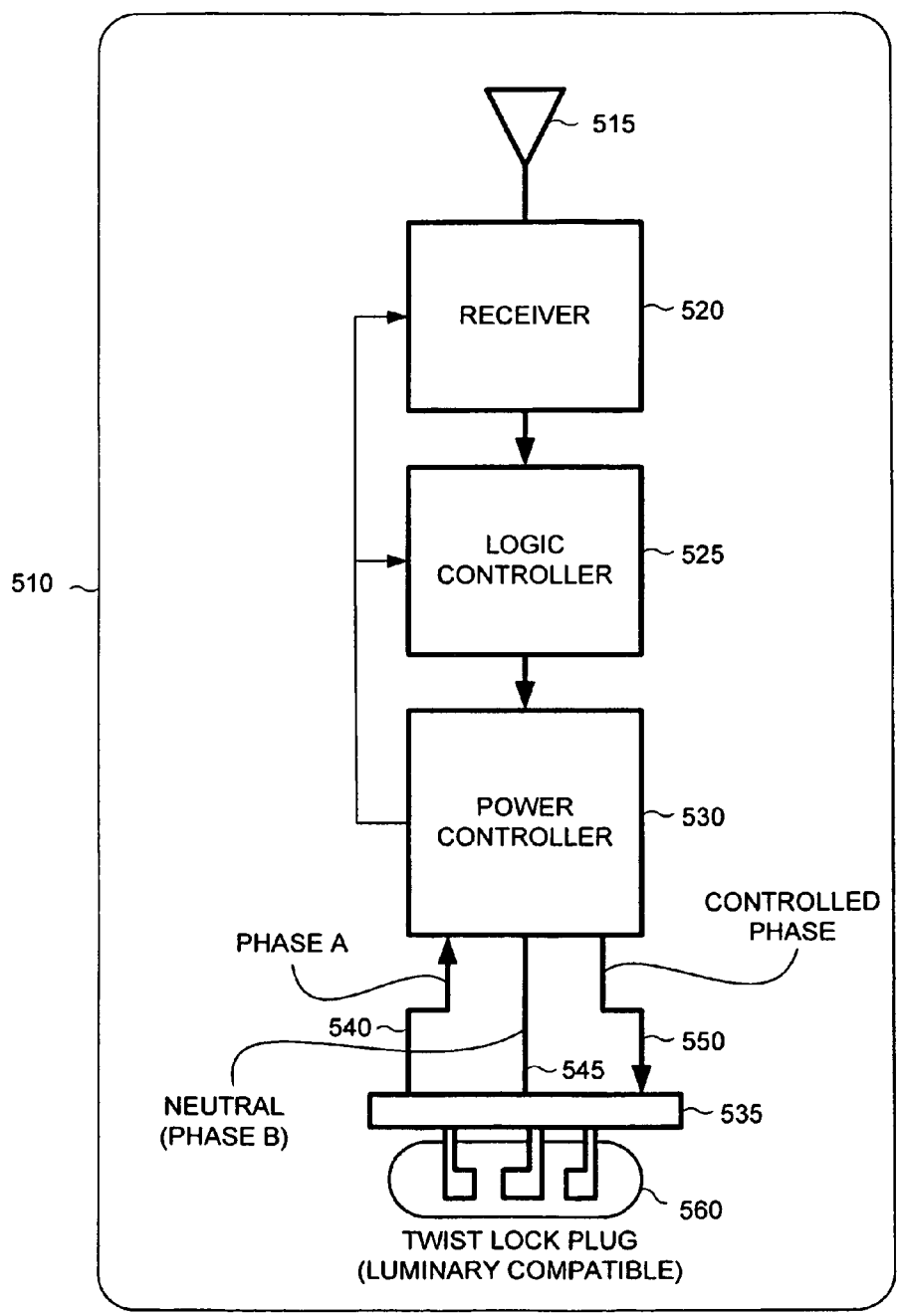
FIG. 13 is a block diagram that depicts several example embodiments of a radio-directed luminary controller.

FIG. 13 is a block diagram that depicts several example embodiments of a radio-directed luminary controller. According to one method and apparatus, a radio-directed luminary controller 510 includes a receiver 520 which provides an input interface for an antenna 515. In one alternative embodiment, an antenna 515 is also included in the radio-directed luminary controller 510. In one example embodiment of the present method and apparatus, a logic-controller 525 is further included in the radio-directed luminary controller 510. In one example embodiment, the radio-directed luminary controller 510 further includes a power controller 530. In one preferred embodiment, the power controller 510 comprises a buck down-converter with a synchronous freewheel switch of the present method and apparatus as described herein. In yet another alternative embodiment, the power controller 510 comprises an on-off switch for simply turning the luminary on and off.

In operation, the logic controller 525 and the receiver 520 are both powered by the power controller 530. The power controller 530 receives electrical power from a three-blade (560), twist lock plug 535, which is included in one example embodiment of the present method and apparatus. It should be noted that power is obtained from the luminary fixture 500 when the twist lock plug 535 is mated with the receptacle 505 included in the luminary fixture 500 for the purpose of accepting a photocell or other controller. Power from the luminary fixture, according to one illustrative use case, comprises 120 volt AC power. In this case, the power controller 530 receives AC neutral 545 and AC phase A 540 from the twist lock plug 535 when said plug is installed in the receptacle 505. In another illustrative use case, the luminary fixture provides a first phase of AC power (phase A 540) and a second phase of AC power (phase B 545). This is a common use scenario when the luminary fixture is wired for 220 volt AC operation in regions of the world where a single phase provide 120 volts relative to neutral. It should be appreciate that in those regions of the world where 220 volts is the normal utility voltage, a single phase provides 220 volts relative to neutral.

When commanded by the logic controller 525, the power controller 530 directs AC voltage received as a first phase 540 to the luminary using an output blade (or terminal) 550 included in the twist lock plug 535. It should be appreciated that in those embodiments that include a simple AC switch as the power controller 530, the luminary 500 will not be dimmed but will only be turned-on or turned-off by the present method an apparatus. In those embodiments that include the buck down-converter in the power controller 530, the output voltage provided 550 to the luminary will vary according to pulse width modulation duty cycle commands received by the power controller 530 from the logic controller 525.

Figure 14:
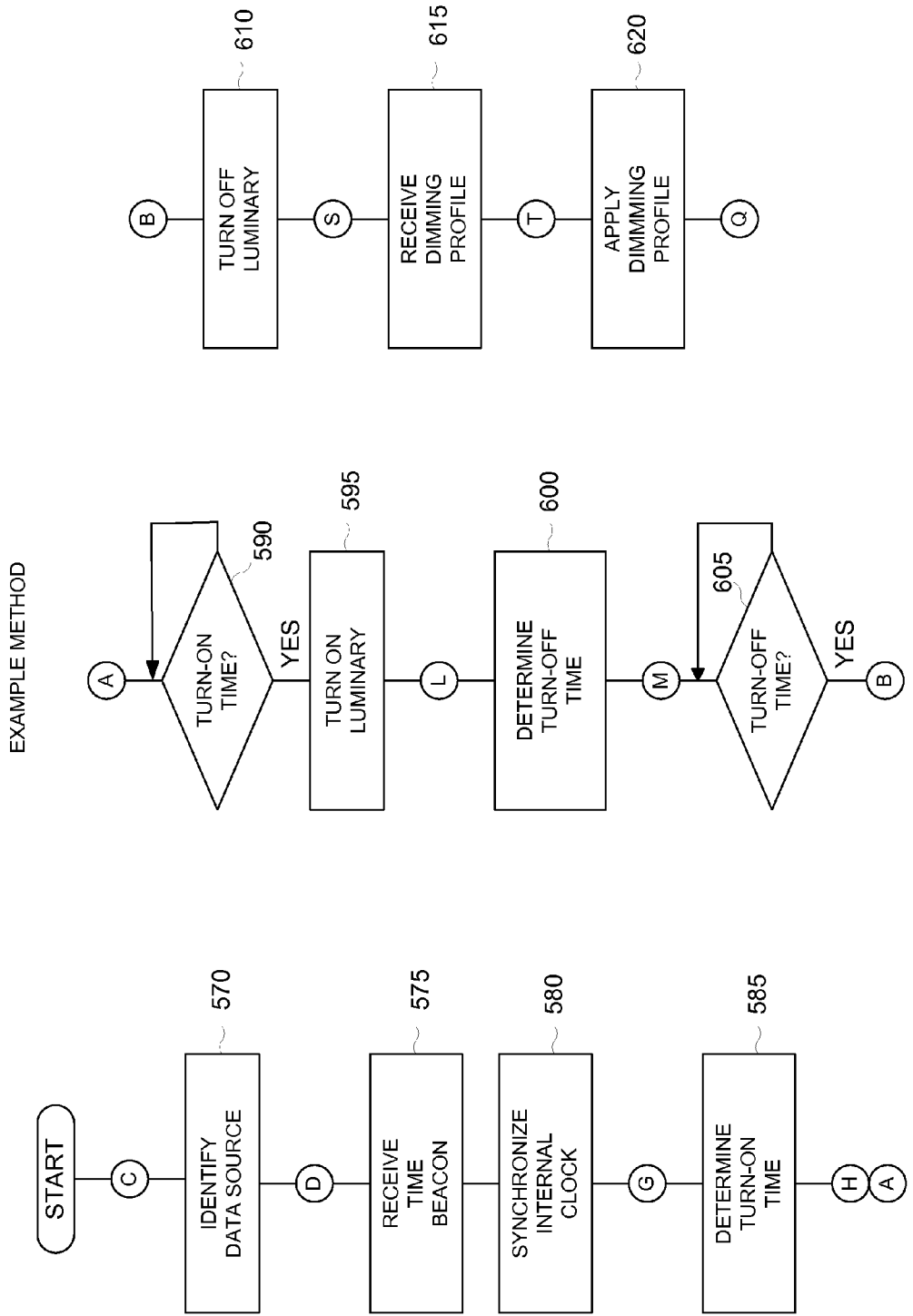
FIG. 14 is a flow diagram that depicts one example method for autonomous control of luminaries.

FIG. 14 is a flow diagram that depicts one example method for autonomous control of luminaries. In this illustrative method, a radio-directed luminary controller 510 uses a receiver 520 included therein to identify a data source (step 570). In this example method; several transmitting stations are used to disseminate information that is used by the luminary controller 510 in order to turn on, turn off and to optionally dim the luminary in order to reduce power consumption.

Once a data source is identified, the luminary controller 510 then receives a time beacon (step 575). According to one illustrative method and embodiment thereof, a luminary controller 510 will then synchronize an internal clock to the received time beacon (step 580). Having accomplished these steps, the luminary controller 510 is then able to turn on, turn off or optionally dim the luminary based on time as prescribed by several other types of information received from the data source or from information that has been programmed into the luminary controller 510 either prior to, contemporaneous with or after the installation of the controller onto a luminary fixture 500.

In one illustrative method, the luminary controller 510 determines a turn-on time (step 585). Once the internal time clock provides a time reading that is substantially equal to, or in one alternative method is greater than or in yet another alternative embodiment is greater than or equal to the determined turn-on time (step 590), then the luminary controller 510 commands the power controller 530 to apply power to the luminary (step 595). Also in this illustrative method, the luminary controller 510 determines a turn-off time (step 600). Once the internal time clock provides a time reading that is substantially equal to, or in one alternative method is greater than or in yet another alternative method is greater than or equal to the determined turn-off time (step 605), then the luminary controller 510 commands the power controller 530 to deprive the luminary of electrical power (step 610).

In yet another illustrative method, the luminary controller 510 receives a dimming profile (step 615). This dimming profile, according to this illustrative method, provides dimming levels for various intervals of time during which the luminary may operate. Accordingly, a luminary controller 510 embodying this illustrative method applies the dimming profile (step 620) according to the time maintained in the internal clock which was synchronized to a time beacon in step 580.

Figure 14A:
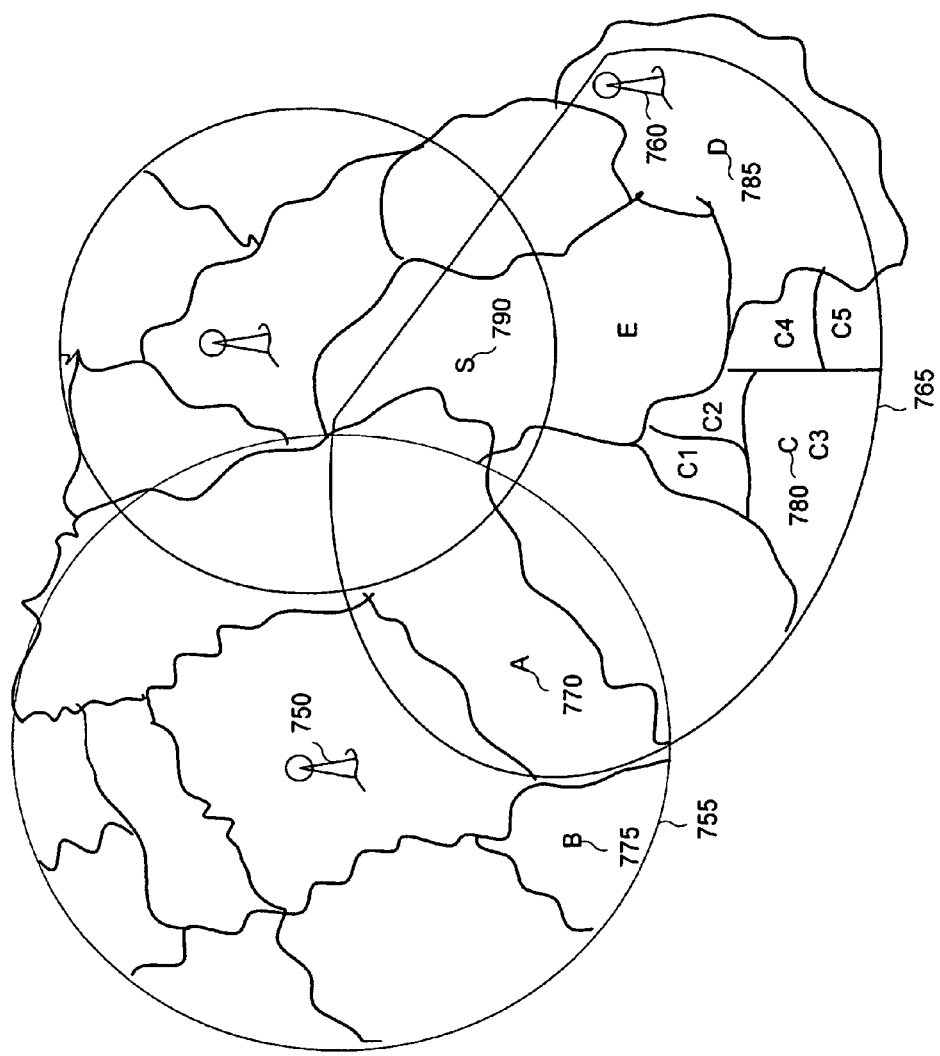
FIG. 14A is a pictorial representation of various methods of geographical partitioning of one or more service regions.

FIG. 14A is a pictorial representation of various methods of geographical partitioning of one or more service regions. It should be appreciate that, although the luminary controller 510 and the methods for luminary control described herein are intended to operate autonomously, there is still a need for the luminary controller 510 to obtain information in order to control luminary operation. According to various alternative methods, as described herein, a geographical region may be within the service region of one or more data sources (e.g. radio stations). Referring now to FIG. 14A, geographical region "A" (770) is able to receive signals from two data sources, in this illustrative example these are transmitter 750 and transmitter 760. The substantially circular patterns in the figure are meant to depict the coverage regions of various radio stations. It should also be noted that a particular radio station may not necessarily offer a substantially circular coverage region. In this example, transmitter 760 uses a directional antenna such that the service region it provides lies to one side of the stations and overlaps portions of the region serviced by transmitter 750.

Figure 15:
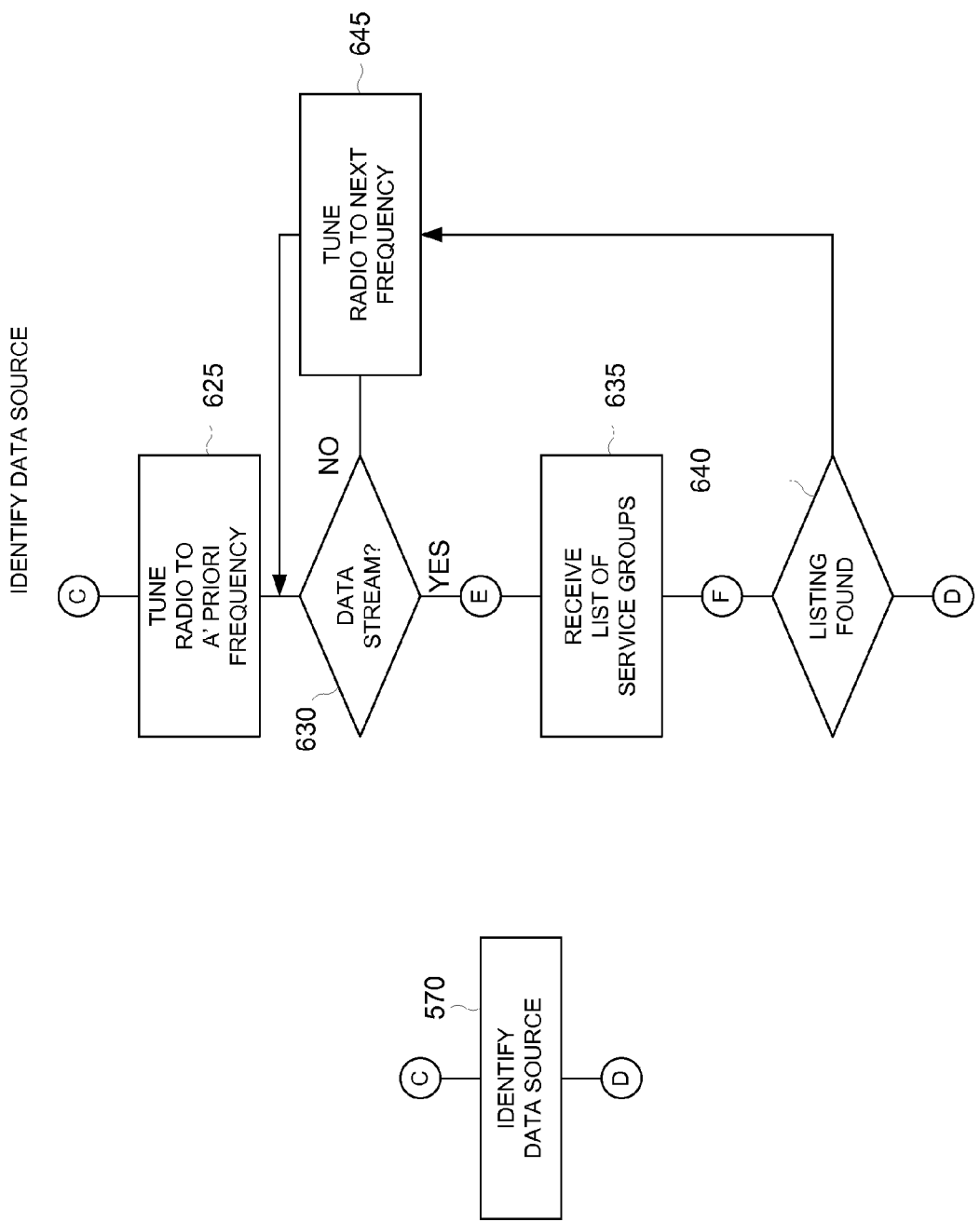
FIG. 15 is a flow diagram that depicts one example method for identifying a data source.

FIG. 15 is a flow diagram that depicts one example method for identifying a data source. A particular luminary controller may be geographically situated in a region that is serviced by only one data source. As discussed above with reference to FIG. 14A, a particular luminary controller located in region A 770 may need to select a data source from one of two or more data sources (e.g. the transmitters described above). In one illustrative alternative method, a luminary controller 570 identifies a data source (step 570) by first tuning to a radio frequency based on a' priori information (step 625). It should be appreciate that tuning to an a' priori radio signal is an optional step. For example, in one illustrative use case, a luminary controller is pre-programmed with a data source identifier either prior to, contemporaneously with or after installation of the controller on the luminary 500. In one alternative method, the data source identifier comprises at least one of a frequency code identifier, a frequency specified in hertz, and a frequency synthesizer coefficient. Those skilled in the art will be able to ascertain that a frequency code identifier or a frequency specification in hertz must be correlated to a frequency synthesizer coefficient, which is then directed to a frequency synthesizer in the receiver 520 included in the luminary controller 510. Once the frequency synthesizer in the receiver 520 is seeded with the frequency coefficient, the receiver 520 is able to receive data from a transmitter transmitting on a particular frequency. Although the above example of selecting a receiver frequency is one exemplary method, the example set forth above is not intended to limit the scope of the claims appended hereto.

Once the frequency for reception has been selected, the luminary controller 510 determines if there is a data stream available from the radio station broadcasting on the selected frequency. If there is no perceptible data stream, the receiver must be tuned to a different frequency (step 645) until a radio station that is broadcasting a perceptible data stream is found (step 630). Once a perceptible data stream is received from a data source (i.e. radio station), the luminary controller 510 receives a list of service groups (step 635). In other words, the luminary controller 510 must determine if a selected radio station is the data source which is providing information for the geographical region within which the luminary controller 510 is physically situated or is providing information for a luminary service group. If the luminary controller 510 finds its service group in the received listing, then that radio station is selected for subsequent use (i.e. it becomes the identified data source). Otherwise (step 640), a different frequency is selected (step 645) and the process is repeated until a data source (i.e. radio station) servicing the service group of a particular luminary controller is found.

Figure 16:
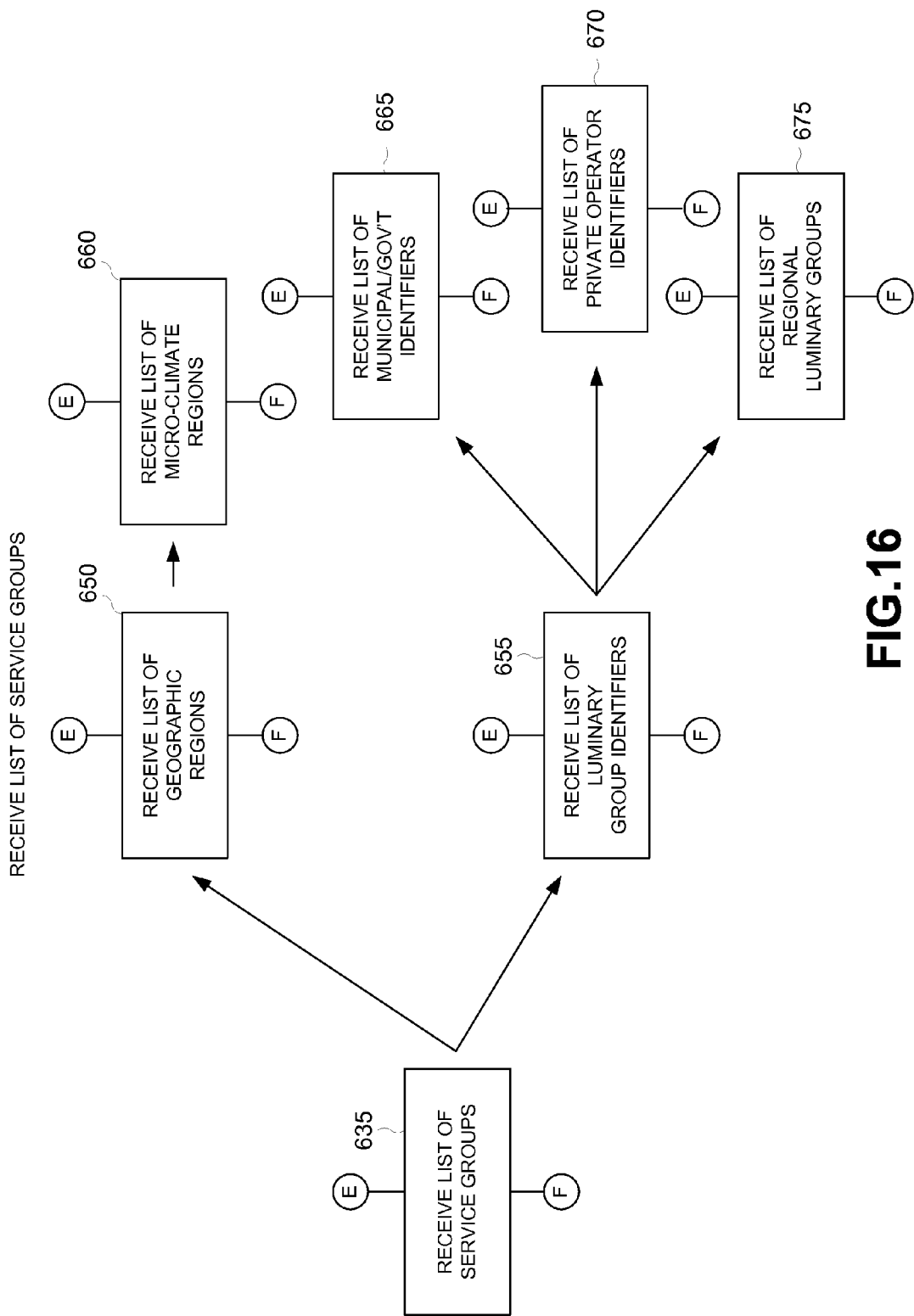
FIG. 16 is a flow diagram that depicts one illustrative method for receiving a list of service groups.

FIG. 16 is a flow diagram that depicts one illustrative method for receiving a list of service groups. Briefly returning to FIG. 14A, it should be appreciate that a service group includes at least one of a geographic region and an identifier of a group of luminaries. Furthermore, a geographic region, in one alternative method, is sub-divided into smaller regions. For example, region C 780 is itself divided into sub-regions C1 through C5, inclusive. In at least one alternative example method, a service group comprises a geographic region (step 650). In yet another illustrative method, the geographic region comprises a region having a substantially uniform climactic character, e.g. a "micro-climate" region (step 660). It is important to appreciate that in those cases where the climactic character within a region is substantially uniform, certain atmospheric conditions will be similar across the region and, according to at least one illustrative alternative method, a dimming profile is established based on such atmospheric conditions.

FIG. 16 further depicts that a service group, according to one alternative method, comprises a luminary group (step 655). A luminary group, according to this example method, comprises at least one of a luminary operated by a particular municipal or government entity (step 665), a luminary operated by a private entity (step 670) and a specifically identifiable group of luminaries (step 675).

When a luminary controller 510 embodies the methods herein described, it should be noted that such a luminary controller 510 is typically configured with an identifier that is used to identify that luminary controller as part of a service group including at least one of said municipal identifier, government entity identifier, private operator identifier and specific luminary group identifier. Configuration of the luminary controller, according to various alternative methods, is accomplished prior to, contemporaneously with or after installation of the luminary controller on the luminary fixture 500. According to one variation of the present method, a luminary controller receives a list of service groups from a particular data source. If that list includes the service group identifier seeded into the luminary controller during configuration, then that luminary controller will use the data source as it's "identified data source" (step 570).

Figure 17:
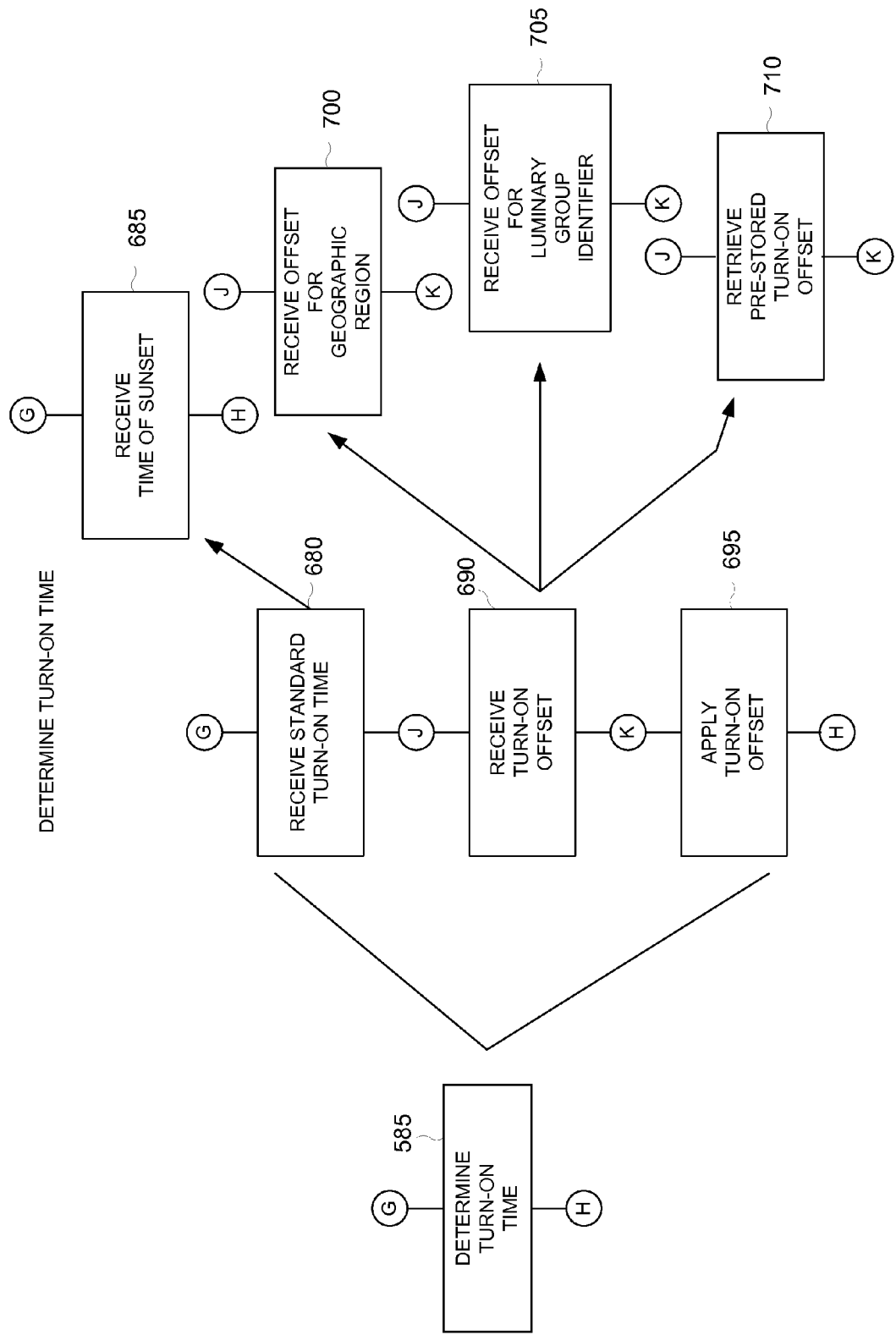
FIG. 17 is a flow diagram that depicts one example method for determining a turn-on time for a luminary.

FIG. 17 is a flow diagram that depicts one example method for determining a turn-on time for a luminary. According to this alternative example method, determining a turn-on time (step 585) comprises receiving a standard turn-on time (step 680). In one alternative method, determining the turn-on time further comprises receiving a turn-on offset (step 690) and applying the turn-on offset to the standard turn-on time in order to determine a turn-on time for the luminary (step 695). In one alternative method, receiving a standard turn-on time comprises receiving the time at which sunset will occur (step 685). In one alternative method, the time at which sunset occurs is received specifically for the location of the luminary, for example for the geographic region within which the luminary is situated. In yet another example method, the time at which sunset occurs is received by the luminary, but the received time of sunset specifies the time at which sunset occurs at the location of the data source (e.g. at the transmitter location).

According to various alternative example methods, the step of receiving a turn-on offset is accomplished in one of several ways including, but not limited to at least one receiving a turn-on offset for a geographic region (step 700) (e.g. a micro-climate region), receiving a turn-on offset for a luminary service group (step 705) and retrieving a pre-stored turn-on offset (step 710). In the case where a turn-on offset is received for a geographic region, one example method provides for receiving by means of a receiver 520 included in the luminary controller 510 an offset value from the identified data source for that particular region in which the luminary is situated. In the case where a turn-on offset is received for a service group, this alternative method provides for receiving by means of a receiver 520 included in the luminary controller 510 an offset value for a particular group of luminaries. As already described, a particular group of luminaries includes a group identified by at least one of a municipality identifier, a government entity identifier, a specific luminary group identifier and a private operator identifier. In the case where a turn-on offset is a pre-stored value, this value is seeded in the luminary controller 510 when it is configured either prior to, contemporaneous with or after the luminary controller 510 is installed on the luminary fixture 500.

Figure 18:
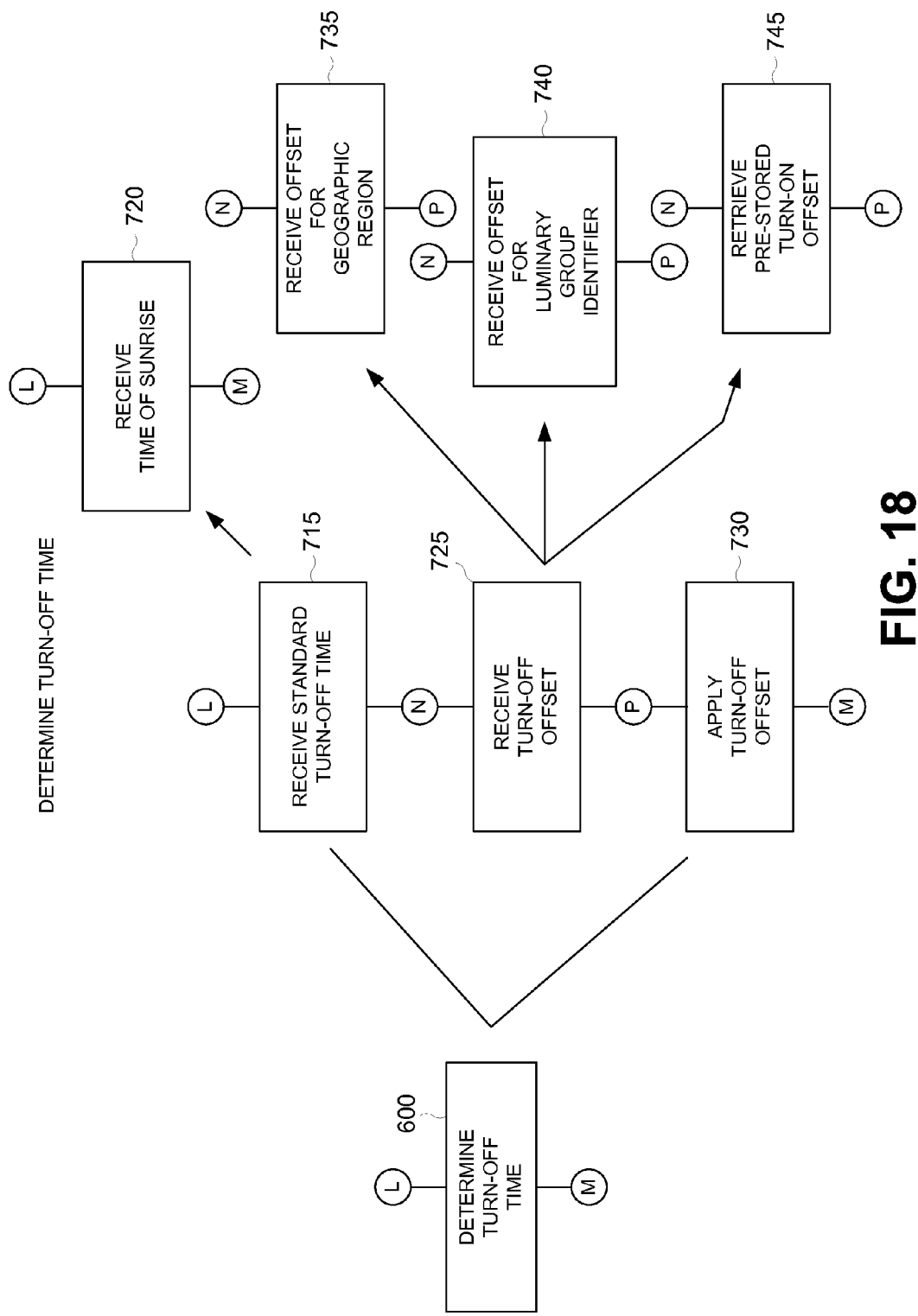
FIG. 18 is a flow diagram that depicts one example method for determining a turn-off time for a luminary.

FIG. 18 is a flow diagram that depicts one example method for determining a turn-off time for a luminary. According to this alternative example method, determining a turn-off time (step 600) comprises receiving a standard turn-off time (step 715). In one alternative method, determining the turn-off time further comprises receiving a turn-off offset (step 725) and applying the turn-off offset to the standard turn-off time in order to determine a turn-off time for the luminary (step 730). In one alternative method, receiving a standard turn-off time comprises receiving the time at which sunrise will occur (step 720). In one alternative method, the time at which sunrise occurs is received specifically for the location of the luminary, for example for the geographic region within which the luminary is situated. In yet another example method, the time at which sunrise occurs is received by the luminary, but the received time of sunrise specifies the time at which sunrise occurs at the location of the data source (e.g. at the transmitter location).

According to various alternative example methods, the step of receiving a turn-off offset is accomplished in one of several ways including, but not limited to at least one of receiving a turn-off offset for a geographic region (step 735) (e.g. a micro-climate region), receiving a turn-off offset for a luminary service group (step 740) and retrieving a pre-stored turn-off offset (step 745). In the case where a turn-off offset is received for a geographic region, one example method provides for receiving by means of a receiver 520 included in the luminary controller 510 an offset value from the identified data source for that particular region in which the luminary is situated. In the case where a turn-off offset is received for a service group, this alternative method provides for receiving by means of a receiver 520 included in the luminary controller 510 an offset value for a particular group of luminaries. As already described, a particular group of luminaries includes a group identified by at least one of a municipality identifier, a government entity identifier, a specific luminary group identifier and a private operator identifier. In the case where a turn-off offset is a pre-stored value, this value is seeded in the luminary controller 510 when it is configured either prior to, contemporaneous with or after the luminary controller 510 is installed on the luminary fixture 500.

Figure 19:
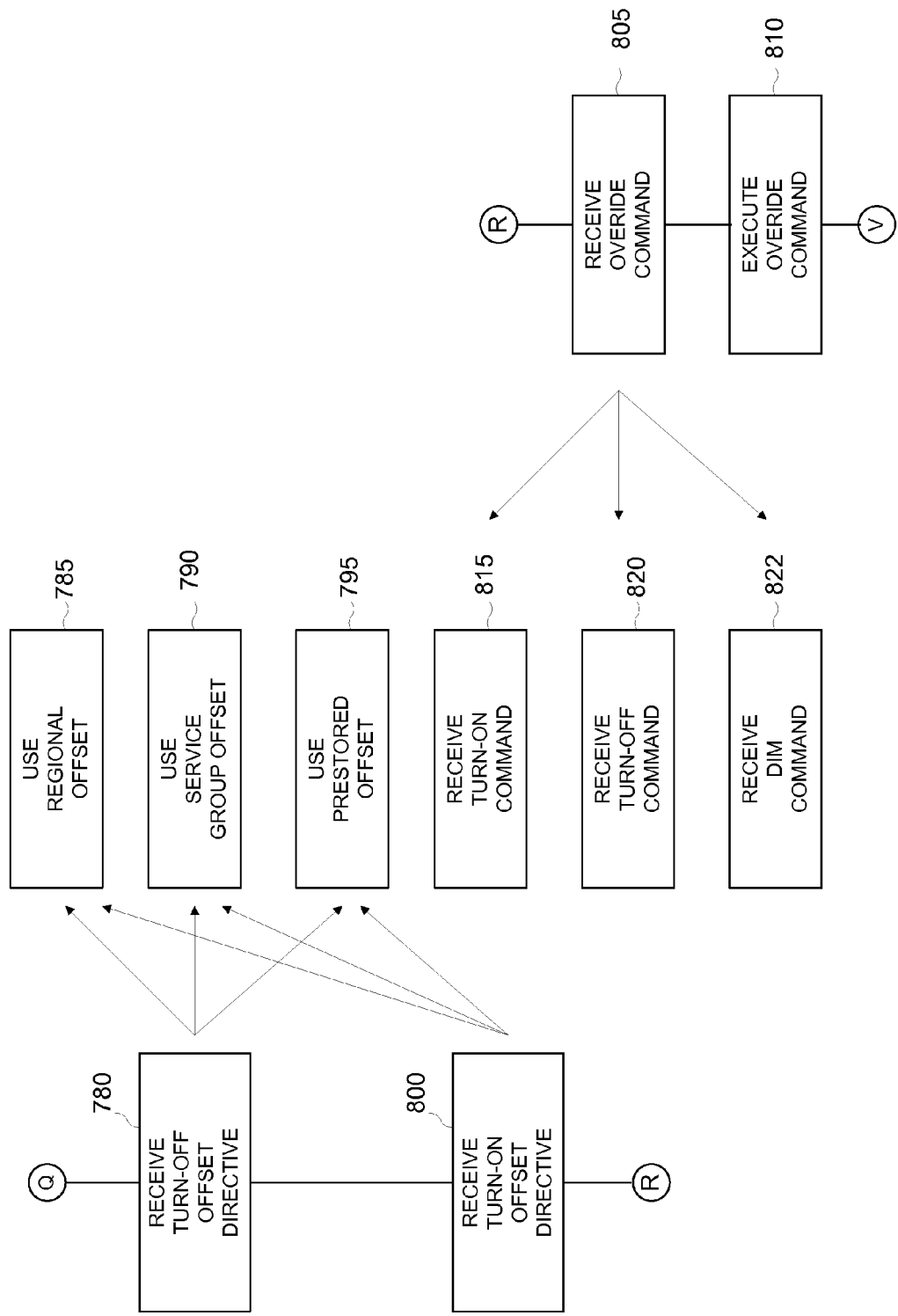
FIG. 19 is a flow diagram that depicts an alternative method for radio directed luminary control.

FIG. 19 is a flow diagram that depicts an alternative method for radio directed luminary control. In this alternative illustrative method, the present method further comprises receiving a turn-off offset directive (step 780). In one alternative method, receiving a turn-off offset directive is accomplished by receiving a "use geographic-region turn-off offset" directive (step 785). In yet another alternative example method, receiving a turn-off offset directive comprises receiving a "use service group turn-off offset" directive (step 790). An in yet another alternative example method, receiving a turn-off offset directive comprises receiving a "use pre-stored turn-off offset" directive (step 795).

Once a luminary controller 510 is installed on a luminary and in service, the operator of the luminary may need to reconfigure the luminary controller as to what type of offset is used for determining an offset time in conjunction with the standard turn-off time received (step 715) by the luminary controller 510. Accordingly, a luminary controller 510 will utilize a particular type of turn-off offset after it perceives such a directive.

It should be appreciated that such directives, according to these illustrative methods, are received by means of a receiver 510 included in the luminary controller 510 and the luminary controller will use the type of turn-off offset specified in the last turn-off offset directive received. In those cases where a "use pre-stored" offset directive is received, the luminary controller will simply use a pre-stored turn-off offset in order to determine the turn-off time. Otherwise, the luminary controller 510 will use at least one of a geographic region turn-off offset and a service group turn-off offset based on the latest turn-off offset directive received by the luminary controller 510 by means of the receiver 520 included therein.

FIG. 19 further depicts that in yet another alternative method for radio directed luminary control, the present method further comprises receiving a turn-on offset directive (step 800). In one alternative method, receiving a turn-on offset directive is accomplished by receiving a "use geographic-region turn-on offset" directive (step 785). In yet another alternative example method, receiving a turn-on offset directive comprises receiving a "use service group turn-on offset" directive (step 790). And in yet another alternative example method, receiving a turn-on offset directive comprises receiving a "use pre-stored turn-on offset" directive (step 795).

Once a luminary controller 510 is installed on a luminary and in service, the operator of the luminary may need to reconfigure the luminary controller as to what type of offset is used for determining an offset time in conjunction with the standard turn-on time received (step 680) by the luminary controller 510. Accordingly, a luminary controller 510 will utilize a particular type of turn-on offset after it perceives such a directive.

It should be appreciated that such directives, according to these illustrative methods, are received by means of a receiver 510 included in the luminary controller 510 and the luminary controller will use the type of turn-on offset specified in the last turn-on offset directive received. In those cases where a "use pre-stored" offset directive is received, the luminary controller will simply use a pre-stored turn-on offset in order to determine the turn-on time. Otherwise, the luminary controller 510 will use at least one of a geographic region turn-on offset and a service group turn-on offset based on the latest turn-on offset directive received by the luminary controller 510 by means of the receiver 520 included therein.

FIG. 19 further depicts that one alternative method for controlling a luminary controller further comprises receiving an override command (step 805) and then executing that override command (step 810). In certain situations, power to a luminary needs to be controlled either to support law enforcement activities or in response to exigent circumstances. In such cases, override commands are received by and acted upon by a radio-directed luminary controller 510. For example, in one alternative method, the luminary controller 510 receives a turn-on command (step 815). This may be utilized by law enforcement in order to override a dimmed luminary disposed near a crime scene. The converse may also be required. Law enforcement may need to turn off luminaries in order to cloak their activities from suspects not yet apprehended. In such cases, the luminary controller 510 will, according to another alternative method, receive a turn-off command (step 820) and preclude power from reaching the lighting elements.

Exigent circumstances, such as power brown-outs, may require power to luminaries to be reduced so as to ease demand upon the power grid. Accordingly, an alternative illustrative method provides for receiving a dim command (step 822) in the luminary and then causing the luminary to be dimmed in response to such an override command. It should be appreciated that such override commands, according to one alternative method, are received by means of a separate command receiver, for example a short range radio frequency (RF) receiver or an infrared pattern detector. In such alternative methods, short range transmitters (either RF or infrared) are used to convey override command to luminaries within range of such short range communications.

Figure 20:
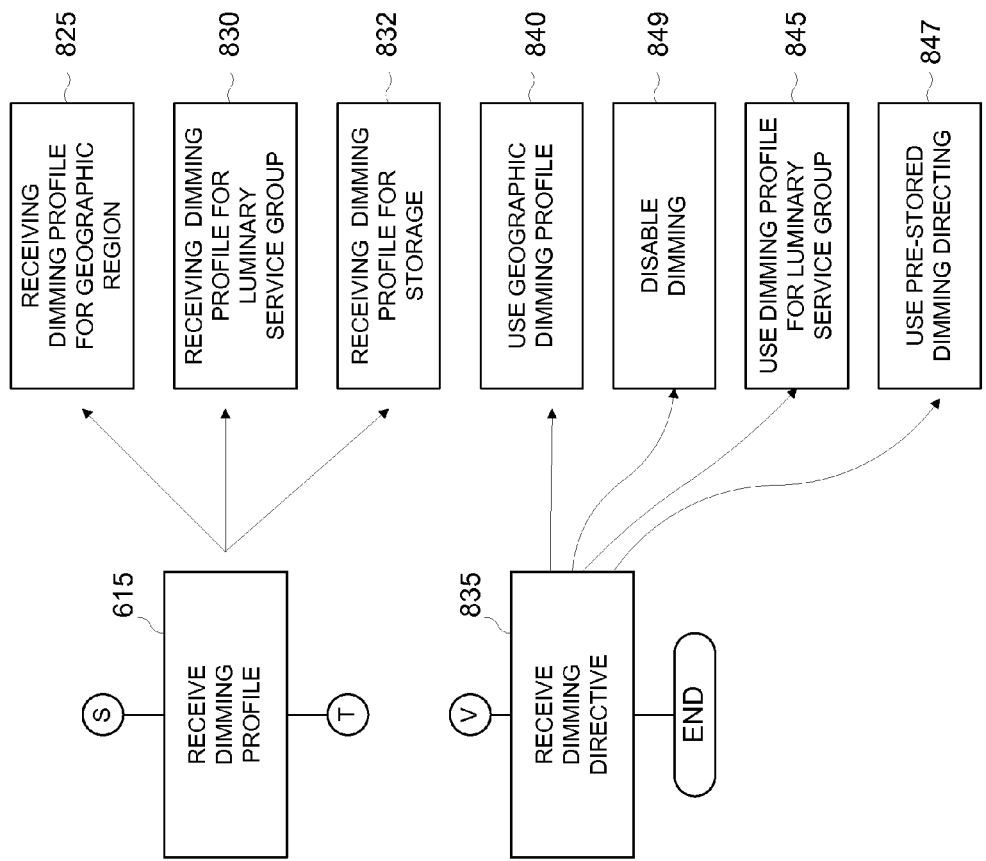
FIG. 20 is a flow diagram that depicts one alternative example method that provides for dimming of luminaries.

FIG. 20 is a flow diagram that depicts one alternative example method that provides for dimming of luminaries. According to this illustrative example method, a luminary controller receives a dimming profile (step 615). A luminary controller, according to one alternative method, receives a dimming profile for a geographic region (step 825). A geographic region, in one alternative method comprises a microclimate as described supra. In yet another alternative method, a luminary controller receives a dimming profile for a luminary service group (step 830). An in yet another alternative example method, the luminary controller receives a dimming profile which is stored for future use. It should be appreciated that in the case where a dimming profile is received for a geographic region or for a luminary service group, the luminary controller will typically receive varying dimming profiles on some periodic basis, (e.g. daily, weekly, monthly or the like). Where a luminary controller receives a dimming profile which it stores for future use, such a dimming profile is typically not changed dynamically. However, there maybe several such pre-stored dimming profiles that may be stored in the luminary controller. It should be appreciated that a dimming profile, according to several alternative example methods, includes an enumeration of dimming levels versus time intervals. For example, dimming levels may be specified for hourly intervals, quarter-hour intervals and the like. It should be appreciated that these illustrative examples are meant to clarify the method of receiving a dimming profile and that any time interval can be used. Accordingly, the claims appended hereto are not intended to be limited to any particular example time intervals herein disclosed.

FIG. 20 further depicts that; according to yet another alternative example method, a luminary controller 510 further receives a dimming directive. According to one illustrative method, receiving a dimming directive comprises receiving a "use geographic dimming profile" directive (step 840). In this case, the luminary controller 510 will dim the luminary 500 under its control based on a dimming profile transmitted by the identified data source for the particular region within which the luminary (and its controller 510) are situated. In yet another illustrative alternative method, the luminary controller receives a "use service group dimming profile" directive (step 845). In this case, the identified data source will transmit a dimming profile for a particular group of luminaries (e.g. by municipal identifier, by government entity identifier, by private operator identifier, or by specific luminary group identifier). In this alternative method, operators of specific luminaries are able to broadcast a new dimming profile that is stored by the luminary controller 510 and used as the basis for dimming. In yet another alternative example method, a luminary controller receives a dimming directive comprising a "use pre-stored dimming profile" directive (step 847). In such case, the luminary controller 510 uses a dimming profile that was stored within the controller either prior to, contemporaneous with, or after the luminary controller 510 is installed on the luminary fixture 500. In yet another illustrative method, receiving a dimming directive 835 comprises receiving a "disabled dimming" directive (step 849).

Figure 21:
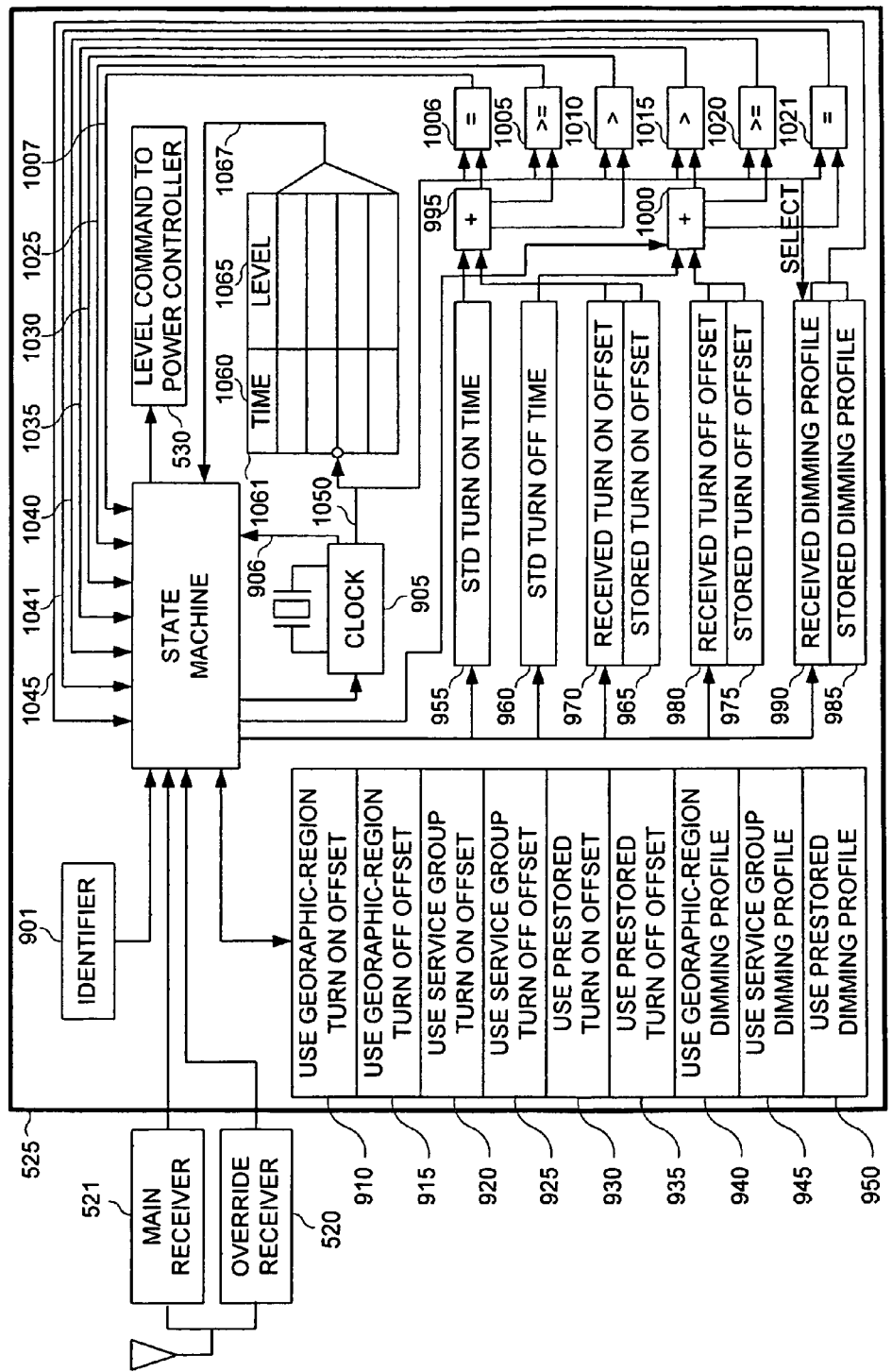
FIG. 21 is a block diagram that depicts various alternative embodiments of a logic controller included in a luminary controller.

FIG. 21 is a block diagram that depicts various alternative embodiments of a logic controller included in a luminary controller. According to one example embodiment, the logic controller 525 of FIG. 13 comprises a state machine 900 and a clock 905. As a state machine 900 operates, the state machine 900 receives information from the receiver 520 included in the luminary controller 510. The state machine 900 is configured to recognize various types of information that it receives from the receiver 520. In one example embodiment, the state machine 900 recognizes a time message. When the state machine 900 recognizes a time message, the state machine extracts a time value from the time message and loads the time value into the clock 905. The clock 905 operates to maintain a current time of day. It should be appreciated that the clock 905, according to various alternative example embodiments, maintains time in the various formats. For example, the clock 905 maintains a current time of day in formats including a local time, a universal time coordinated and a system time.

In one example embodiment, the state machine 900 receives an identifier 901 in order to determine a data source from which the receiver 520 will receive information. In this example embodiment, the identifier 901 comprises at least one of a geographic identifier, a sub-geographic identifier, a municipality identifier, a government entity identifier, a private operator identifier, and a specific luminary group identifier. Accordingly, the state machine 900 first directs the receiver 520 to receive information on a particular radio frequency. The state machine 910 interrogates the receiver 520 in order to determine if the radio station on that particular radio frequency is transmitting a data stream recognizable by the state machine 900. In the event that a data stream is present on the radio frequency to which the receiver 520 is tuned to, then the state machine 900 begins receiving information from the receiver 520. Otherwise, the state machine 900, directs the receiver 520 to tune to a different radio frequency. The state machine 900 will continue the process of directing the receiver 520 to a different frequency until the state machine 900 determines that the receiver 520 is receiving a data stream from a radio station at a particular frequency as specified to the receiver 520 by the state machine 900.

As the state machine 900 receives information from the receiver 520, the state machine 900, according to one alternative example embodiment, receives a list of service groups from the receiver 520. According to this example alternative embodiment, the state machine 900 will compare the identifier 901 to identifiers included in the list of service groups that the state machine 900 obtains from the receiver 520. In the event that a successful comparison is made by the state machine 900, the state machine 900 will continue to receive information from the receiver 520 using the current frequency programmed into the receiver 520 by the state machine 900. Otherwise, the state machine 900 will direct the receiver 520 to a different frequency in order to again search for a data stream. This process, according to this alternative example embodiment, continues as the state machine 900 obtains various lists of service groups as transmitted by various radio stations that are transmitting a perceptible data stream and selected by the receiver 520 at various frequencies, said frequencies being specified by the state machine 900.

As the state machine continues to operate, according to one alternative example embodiment, the state machine 900 is configured to receive a standard turn-on time from the receiver 520. When the state machine 900 receives a standard turn-on time from the receiver 520, the state machine 900 stores a standard turn-on time in a standard turn-on time register 955 included in the logic controller 525. According to yet another alternative example embodiment, the state machine 900 is configured to receive a standard turn-off time from the receiver 520. When the state machine 900 receives a standard turn-off time from the receiver 520, the state machine 900 stores the standard turn-off time in a standard turn-off time register 960 included in the logic controller 525.

In one alternative example embodiment, the logic controller 525 further includes one or more mode indicators that can be set and read by the state machine 900. According to various alternative example embodiments, said mode indicators included at least one of a "use geographic-region turn-on offset" mode indicator 910, a "use geographic-region turn-off offset" mode indicator 915, a "use service group turn-on offset" mode indicator 920, a "use service group turn-off offset" mode indicator 925, a "use prestored turn-on offset" mode indicator 930, a "use prestored turn-off offset" mode indicator 935, a "use geographic-region dimming profile" mode indicator 940, a "use service group dimming profile" mode indicator 945, and a "use prestored dimming profile" mode indicator 950.

FIG. 21 further illustrates that, according to various alternative example embodiments, the state machine 900 is configured to receive information comprising mode-switching directives. It should be appreciated that the state machine 900 includes a parser that enabled the state machine 900 to determine the type of mode-switching directive received. According to one alternative example embodiment, the state machine 900 receives from the receiver 520 mode-switching directives comprising at least one of a turn-off offset directive and turn-on offset directive. According to yet another alternative example embodiment, the state machine 900 receives a dimming directive from the receiver 520.

The state machine 900 responds to various turn-off offset directives including, but not limited to at least one of a "use geographic-region turn-off offset" directive, a "use service group turn-off offset" directive, and a "use prestored turn-off offset" directive. In the case where the state machine 900 receives a "use geographic-region turn-off offset" directive, the state machine 900 responds by setting the "use geographic-region turn-off offset" mode indicator 910. The state machine then clears the "use service group turn-off offset" mode indicator 925 and the "use prestored turn-off offset" mode indicator 935. In the case where the state machine 900 receives a "use service group turn-off offset" directive, the state machine 900 responds by setting the "use service group turn-off offset" mode indicator 925. The state machine then clears the "use geographic-region turn-off offset" mode indicator 915 and the "use prestored turn-off offset" mode indicator 935. In the case where the state machine 900 receives a "use prestored turn-off offset" directive, the state machine 900 responds by setting the "use prestored turn-off offset" mode indicator 935. The state machine then clears the "use geographic-region turn-off offset" mode indicator 915 and the "use service group turn-off offset" mode indicator 925.

The state machine 900 responds to various turn-on offset directives including, but not limited to at least one of a "use geographic-region turn-on offset" directive, a "use service group turn-on offset" directive, and a "use prestored turn-on offset" directive. In the case where the state machine 900 receives a "use geographic-region turn-on offset" directive, the state machine 900 responds by setting the "use geographic-region turn-on offset" mode indicator 910. The state machine then clears the "use service group turn-on offset" mode indicator 920 and the "use prestored turn-on offset" mode indicator 930. In the case where the state machine 900 receives a "use service group turn-on offset" directive, the state machine 900 responds by setting the "use service group turn-on offset" mode indicator 920. The state machine then clears the "use geographic-region turn-on offset" mode indicator 910 and the "use prestored turn-on offset" mode indicator 930. In the case where the state machine 900 receives a "use prestored turn-on offset" directive, the state machine 900 responds by setting the "use prestored turn-on offset" mode indicator 930. The state machine then clears the "use geographic-region turn-on offset" mode indicator 910 and the "use service group turn-on offset" mode indicator 920.

The state machine 900 responds to various dimming directives including, but not limited to at least one of a "use geographic-region dimming profile" directive, a "use service group dimming profile" directive, a "use prestored dimming profile" directive and a "disable dimming" directive. In the case where the state machine 900 receives a "use geographic-region dimming profile" directive, the state machine 900 responds by setting the "use geographic-region dimming profile" mode indicator 940. The state machine then clears the "use service group dimming profile" mode indicator 945 and the "use prestored dimming profile" mode indicator 950. In the case where the state machine 900 receives a "use service group dimming profile" directive, the state machine 900 responds by setting the "use service group dimming profile" mode indicator 945. The state machine then clears the "use geographic-region dimming profile" mode indicator 940 and the "use prestored dimming profile" mode indicator 950. In the case where the state machine 900 receives a "use prestored dimming profile" directive, the state machine 900 responds by setting the "use prestored dimming profile" mode indicator 950. The state machine then clears the "use geographic-region dimming profile" mode indicator 940 and the "use service group dimming profile" mode indicator 945. In the case where the state machine 900 receives a "disable dimming" directive, the state machine 900 clears the "use geographic-region dimming profile" mode indicator 940, the "use service group dimming profile" mode indicator 945, and the "use prestored dimming profile" mode indicator 950.

In one example alternative embodiment, the logic controller 525 includes at least one of a prestored turn-off offset register 975 and a prestored turn-on offset register 965. In one alternative example embodiment, when the state machine 900 receives a static turn-off offset time from the receiver 520, then the state machine 900 stores the static turn-off offset time in the prestored turn-off offset register 975. In yet another alternative example embodiment, when the state machine 900 receives a static turn-on offset time from the receiver 520, then the state machine 900 stores the static turn-on offset time in the prestored turn-on offset register 975.

In one alternative example embodiment, the state machine 900 is configured to receive a turn-on offset value including at least one of a geographic-region turn-on offset and a service group turn-on offset. According to this alternative example embodiment, the state machine 900 determines the type of turn-on offset that should be used based on the "use geographic-region turn-on offset" mode indicator 910 and the "use service group turn-on offset" mode indicator 920. When the "use geographic-region turn-on offset" mode indicator 910 is set, state machine 900 will ignore service group turn-on offset values that are received from the receiver 520 and will store a geographic-region turn-on offset value received from the receiver 520 in a stored turn-on offset register 970 included in this example alternative embodiment of a logic controller 525. It should be appreciated that the state machine will select a geographic-region turn-on offset value from information received by the receiver 520 and selecting a geographic-region turn-on offset value according to the identifier 901, which in this example embodiment comprises a geographic region identifier. When the "use service group turn-on offset" mode indicator 920 is set, state machine 900 will ignore geographic-region turn-on offset values that are received from the receiver 520 and will store a service group turn-on offset value received from the receiver 520 in the stored turn-on offset register 970 included in this example alternative embodiment of a logic controller 525. Accordingly, the state machine will select a service group turn-on offset value from information received from the receiver 520 according to the identifier 901, which in this example embodiment comprises a service group identifier.

In one alternative example embodiment, the state machine 900 is configured to receive a turn-off offset value including at least one of a geographic-region turn-off offset and a service group turn-off offset. According to this alternative example embodiment, the state machine 900 determines the type of turn-off offset that should be used based on the "use geographic-region turn-off offset" mode indicator 915 and the "use service group turn-off offset" mode indicator 925. When the "use geographic-region turn-off offset" mode indicator 915 is set, state machine 900 will ignore service group turn-off offset values that are received from the receiver 520 and will store a geographic-region turn-off offset value received from the receiver 520 in a stored turn-off offset register 980 included in this example alternative embodiment of a logic controller 525. It should be appreciated that the state machine will select a geographic-region turn-off offset value from information received by the receiver 520 and selecting a geographic-region turn-off offset value according to the identifier 901, which in this example embodiment comprises a geographic region identifier. When the "use service group turn-off offset" mode indicator 925 is set, state machine 900 will ignore geographic-region turn-off offset values that are received from the receiver 520 and will store a service group turn-off offset value received from the receiver 520 in the stored turn-off offset register 980 included in this example alternative embodiment of a logic controller 525. Accordingly, the state machine will select a service group turn-off offset value from information received from the receiver 520 according to the identifier 901, which in this example embodiment comprises a service group identifier.

FIG. 21 also illustrates that according to one alternative example embodiment, the logic controller 525 receives a dimming profile including at least one of a geographic-region dimming profile, a service group dimming profile, and a prestored dimming profile. It should be appreciated that these dimming profiles are typically, but not necessarily received by means of the receiver 520. As the state machine 900 continues to operate, it determines the type of dimming profile that should be received based on the geographic region dimming profile mode indicator 940, the use service group dimming profile mode indicator 945 and the use stored dimming profile 950. In the case where the geographic-region dimming profile mode indicator 940 is set, state machine 900 will receive, by means of the receiver 520, a dimming profile for a geographic-region selected from information received by their receiver 520 according to the identifier 901. Once the dimming profile for a geographic-region is extracted from information received by the receiver 520, that dimming profile is stored in a received dimming profile table 985. In the case where the state machine 900, as a continues to operate, determines that the use service group dimming profile mode indicator 945 is set, then the state machine 900 will receive information from the receiver 520 and will extract a dimming profile for a particular service group and store that dimming profile in the received dimming profile table 985. In the event that the prestored dimming profile mode indicator 950 is set, the state machine 900 will receive a dimming profile and store the dimming profile in the prestored dimming profile table 990. This dimming profile, according to this example alternative embodiment, will remain as a static dimming profile and will continue to be stored in the pestored dimming profile table 990. It should be appreciated that, according to this illustrative example embodiment, a dimming profile table 1061 comprises at least two columns of information including, but not limited to at least one of a time value 1060 and a level value 1065. It should be appreciated that state machine 900 stores the dimming profile in the dimming profile table 1061 according to time values and level values which are then associated with particular time values.

FIG. 21 further illustrates that according to yet another alternative example embodiment, a luminary controller 510 also includes an override receiver 521. According to this alternative example embodiment, the override receiver 521 comprises a receiver receiving information on a different radio frequency than directives and other information received by receiver 520. It should be appreciated that, according to this illustrative example embodiment, the override receiver 521 is used to receive static information including, but not limited to at least one of a prestored turn on offset (which is stored in the stored turn on offset register 965), a prestored turn off offset (which is stored in the stored turn off offset register 975 and prestored dimming profile which is stored in a prestored dimming profile table 990. In yet another alternative example embodiment, the override receiver 521 receives override directives as defined supra and directs these override directives to state machine 900. In all cases, the state machine 900 is responsive to information received from the override receiver 521 in a manner analogous to the state machine's 900 operation as it receives information from the first information receiver 520.

FIG. 21 also illustrates that according to yet another alternative example embodiment, a luminary controller 510 includes a logic controller 525 wherein the state machine 900 is responsive to one or more input signals, which are derived by comparing a current time 1050 to at least one of a determined turn on time and a determined turn off time. In one example alternative embodiment, a standard turn on time stored in a turn on time register 955 is compared to a current time value 1050. In this case, the state machine 900, upon a successful comparison, generates a command to the power controller 530 in order to turn on the luminary. In yet another alternative example embodiment, standard turn on time, also stored in a turn on time register 955, is added to (1000) either to a prestored turn-on offset, which is stored in a turn on offset register 965, or is added to a received turn on offset which is stored in a received turn on offset register 970. The state machine 900 uses either the prestored turn on offset 965 or the received turn on offset 970 based on the state of the use prestored turn on offset mode indicator 930. When the prestored turn on offset mode indicator 930 is set, then the value stored in the stored prestored turn on offset register 965 is used. Otherwise the value stored in the received turn on offset register 970 is used as an offset to standard turn on time stored in the standard turn on time register 955. In this alternative example embodiment, the stored or the received turn on offset is added (1000) to the standard turn on time value stored in a register 955 and is then compared to the current time 1050. According to various alternative example embodiment, the comparison of either of the standard turn on time value stored in register 955 (standard turn on time register) or the sum of the standard turn on time value a selected the turn on offset is accomplished by at least one of an equal to comparator 1021, an equal to or greater than comparator 1020, and a greater than comparator 1015. The output of these comparators is sampled by the state machine 900. According to various alternative example embodiments, the state machine 900 responds to one of at least an active signal (1041) from either the equal to comparator 1021, an active signal (1040) the greater than or equal to comparator 1020 and an active signal 1035 from the greater than comparator 1015. In response to one or more of these active signals, the state machine 900 direct state command to the power controller 530 in order to activate power to the luminary.

In one example alternative embodiment, a standard turn off time stored in a turn off time register 960 is compared to a current time value 1050. In this case, the state machine 900, upon a successful comparison, generates a command to the power controller 530 in order to turn off the luminary. In yet another alternative example embodiment, the standard turn off time, also stored in a turn off time register 960, is added to (995) either to a prestored turn-off offset, which is stored in a prestored turn off offset register 975, or is added to a received turn off offset which is stored in a received turn off offset register 980. The state machine 900 uses either the prestored turn off offset 975 or the received turn off offset 980 based on the state of the use prestored turn off offset mode indicator 935. When the prestored turn off offset mode indicator 935 is set, then the value stored in the prestored turn off offset register 975 is used. Otherwise the value stored in the received turn off offset register 980 is used as an offset to standard turn off time stored in the standard turn off time register 960. In this alternative example embodiment, the stored or the received turn off offset is added (995) to standard turn off time value stored in a register 960 and is then compared to the current time 1050. According to various alternative example embodiment, the comparison of either of the standard turn off time value stored in register 960 (standard turn off time register) or the sum of the standard turn off time value and one of the selected turn off offsets is accomplished by at least one of an equal to comparator 1006, an equal to or greater than compartor 1005, and a greater than compartor 1010. The output of these comparators is sampled by the state machine 900. According to various alternative example embodiment, the state machine 900 responds to one of at least an active signal (1007) from either the equal to comparator 1006, an active signal (1025) the greater than or equal to comparator 1005 and an active signal 1030 from the greater then comparator 1010. In response to one or more of these active signals, the state machine 900 directs a command to the power controller 530 in order to turn off power to the luminary.

In one example alternative embodiment, the state machine 900 uses as the basis for dimming. i.e. reducing the power provided to, the luminary at least one of a prestored dimming profile that is stored in the stored dimming profile table 990 included in this alternative embodiment of a logic controller 525 and a received dimming profile stored in the received dimming profile table 985 included in this alternative example embodiment. As the state machine 900 continues to operate, it will receive a dimming control signal 906 from the clock 905. When the state machine 900 receives the dimming control signal 906, the state machine 900 will respond by obtaining a dimming level from at least one of the stored dimming profile table 990 and the received dimming profile table 985. The state machine 900 will select one of the dimming profile tables based on the use stored dimming profile mode indicator 950. In the event that the use stored dimming profile monitor 950 is set, then the state machine will use the prestored dimming profile table 990 as the basis for reducing power to the luminary 500. Otherwise, the state machine 900 will use the received dimming profile table 985 as the basis for reducing power to the luminary 500. Whenever the state machine 900 receives a dimming control signal 906 from the clock 905, the state machine will retrieve from the selected the dimming profile table (i.e. either the received dimming profile table 985 of the prestored dimming profile table 990) a level value (as depicted in the example table as column 1065), said value being selected according to a time value (as depicted in the example table column 1060) and said selection time value (1050) being provided by the clock 905. Once the state machine 900 receives the dimming level value from at least one of the stored dimming profile table 990 and the received dimming profile table 985, the state machine 900 generates a level command to the power controller 530, said level command comprising, according to one alternative example embodiment, a duty cycle value.

Figure 22:
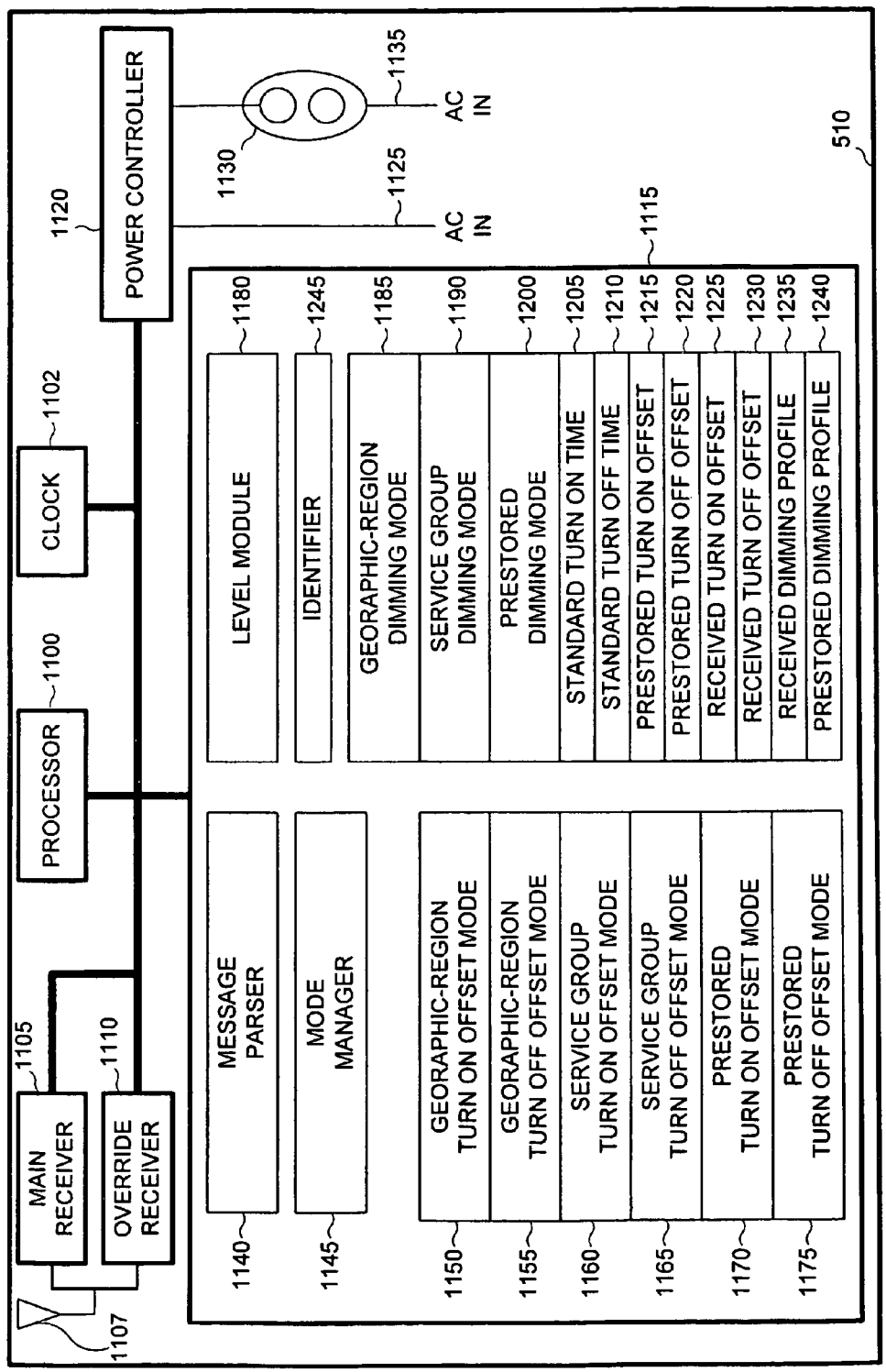
FIG. 22 is a block diagram that depicts alternative example embodiments of a luminary controller.

FIG. 22 is a block diagram that depicts alternative example embodiments of a luminary controller. In one example embodiment, a luminary controller 510 comprises one or more processors 1100, a memory 1115, a main receiver 1105, and a power controller 1120. In one alternative embodiment, a luminary controller 510 further comprises an override receiver 1110. It should be appreciated that the receiver 1105 and in those embodiments that further included the override receiver 1110, according to various alternative example embodiments, comprise at least one of a wired network interface and a wireless receiver including, but not limited to a short-range remote control receiver, a long-range information receiver, and infrared communication link and a wireless network receiver. Accordingly, in those embodiments where the receiver (1105 or 1110) comprises a wireless receiver, an antenna 1107 is also included in the luminary controller 510. It should further be recognized that the antenna 1107, according to alternative illustrative embodiments, is disposed either within the luminar controller 510 or is disposed external there to. In those alternative example embodiments where the receiver comprises a network interface, such a network interface comprises at least one of a wired and wireless network interface. In either case, connectivity to a network enables the processor 1100 to receive information and operating directives according to the methods taught herein. It should also be appreciated that, according to various alternative example embodiments, a luminary controller 510 further comprises a clock 1102 and a power controller 1120. The power controller 1120 receives AC input power 1125 and delivers the AC input power to a reactive load 1130, e.g. a magnetic ballast which in turn drives an arc discharge lamp 1130. It should further be appreciated that the reactive load returns AC back to the source 1135.

Also included in various example alternative embodiments of aluminary controller 510 are one or more functional modules. A functional module is typically embodied as an instruction sequence. An instruction sequence that implements a functional module, according to one alternative embodiment, is stored in the memory 1115. The reader is advised that the term "minimally causes the processor" and variants thereof is intended to serve as an open-ended enumeration of functions performed by the processor 1100 as it executes a particular functional module (i.e. instruction sequence). As such, an embodiment where a particular functional module causes the processor 1100 to perform functions in addition to those defined in the appended claims is to be included in the scope of the claims appended hereto.

The functional modules (i.e. their corresponding instruction sequences) described thus far that enable luminary control according to the present method are, according to one alternative embodiment, imparted onto computer readable medium. Examples of such medium include, but are not limited to, random access memory, read-only memory (ROM), programmable read only memory, flash memory, electrically erasable programmable read only memory, compact disk ROM (CD ROM), floppy disks, hard disk drives, magnetic tape and digital versatile disks (DVD). Such computer readable medium, which alone or in combination can constitute a stand-alone product and can be used to convert a general-purpose computing platform into a device capable of controlling luminaries according to the techniques and teachings presented herein. Accordingly, the claims appended hereto are to include such computer readable medium imparted with such instruction sequences that enable execution of the present method and all of the teachings herein described.

FIG. 22 further illustrates that, according to one alternative example embodiment, a luminary controller 510 includes a message parser module 1140, the mode Manager module 1145, and a level module 1180, all of which are stored in the memory 1115. According to this alternative example embodiment, the luminary controller 510 further includes an identifier 1245, which is stored in the memory 1115. In one example embodiment, the luminary controller 510 further includes mode indicators stored in memory 1115 including but not limited to a geographic-region turn on offset mode indicator 1150, and a geographic-region turnoffs offset mode indicator 1155. In yet another alternative example embodiment, the luminary controller 510 further includes at least one of a service group turn on offset mode indicator 1160 and a service group turn off the offset mode indicator 1165, any one or more of which are stored in the memory 1115. And in yet another alternative example embodiment, the luminary controller 510 further includes at least one of a prestored turn on offset mode indicator 1170 and a prestored turnoffs offset mode indicator 1175, any one or more of which are stored in the memory 1115. In one alternative example embodiment, the luminary controller 510 further includes dimming mode indicators stored in the memory 1115, said dimming mode indicators including at least one of a geographic-region at dimming mode indicator 1185, a service group dimming mode indicator 1190 and a prestored dimming mode indicator 1200.

FIG. 22 also illustrates that, according to various alternative example embodiments, various operating information is stored in the memory 1115. In one alternative example embodiment, the memory 1115 is used to store at least one of a standard turn on time 1205 and a standard turn off time 1210. In yet another alternative example embodiment, the memory 1115 is used to store at least one of a prestored turn on offset 1215 and a prestored turnoffs offset 1220. And in yet another alternative example embodiment, the memory 1115 is used to store at least he received turn on offset 1225 and a received turn off offset 1230. In yet another example alternative embodiment, the memory 1115 is used to receive at least one of a received dimming profile 1235 and a prestored dimming profile 1240.

Figure 23:
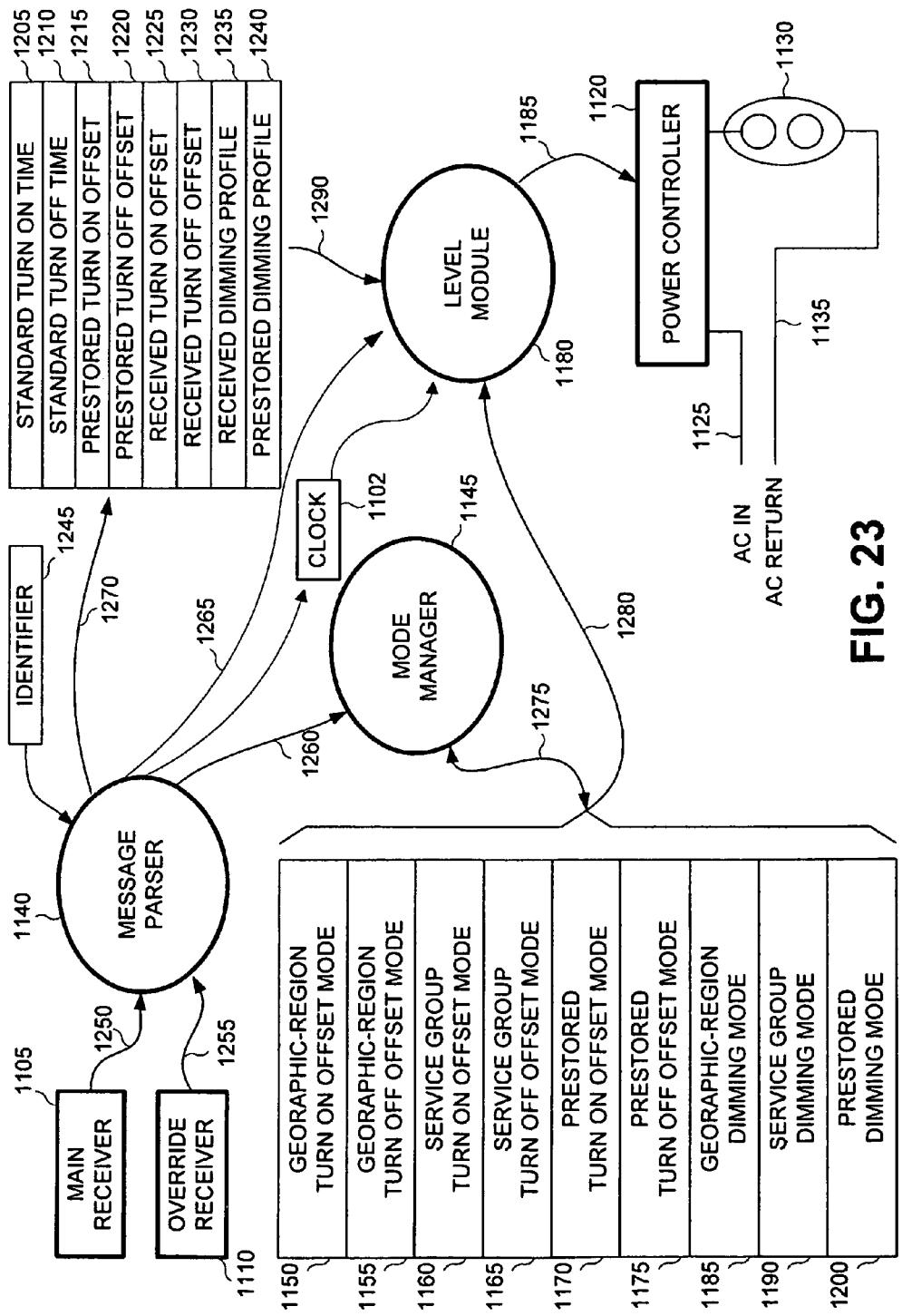
FIG. 23 is a data flow diagram that depicts the operation of a processor-based luminary controller.

FIG. 23 is a data flow diagram that depicts the operation of a processor-based luminary controller. As the processor 1100 begins to execute instructions, the processor 1100 begins executing instructions included in the message parser 1140. It should be appreciated that, according to one preferred alternative embodiment, particular forms of information are received either from the main receiver 1105 or the override receiver 1110. However, the claims appended hereto are not intended to be limited in scope to any one preferred alternative embodiment and the scope of the claims appended hereto is to embrace embodiments where information is received from either receiver for any particular purpose. For example, the preponderance of information necessary to control the luminary is received 1250 from the main receiver 1105 whereas override directives are typically received from the override receiver 1110. Again, the claims appended hereto are not to be limited in scope and in fact information necessary to control the luminaries, according to alternative embodiments, are received by means of the override receiver 1110 and override directives are received by the main receiver 1105.

The message parser 1140, when executed by the processor 1100, minimally causes the processor 1100 to receive information from at least one of the main receiver 1105 and the override receiver 1110. As messages are received by the processor 1100, as it executes the message parser module 1140, the processor 1100 recognizes particular types of messages including, but not limited to information messages and operating directives. Upon startup, the message parser module 1140, when executed by the processor 1100, minimally causes the processor 1100 to determine a data source from which the main receiver 1105 will receive information. As the processor 1100 continues to execute the message parser 1140, the message parser 1140 minimally causes the processor 1100 to set the main receiver 1105 to a particular radio frequency. The processor 1100 will then search for a perceptible datastream at that particular radio frequency. In the event that a perceptible datastream is not present a particular radio frequency, the processor 1100, as it continues to execute the message parser 1140, will direct the main receiver 1105 to receive at a different frequency. This process continues until the processor 1100 detects a perceptible datastream on a radio frequency received by the main receiver 1105. At this stage, the processor 1100, according to one alternative example embodiment, will receive a list of service groups from the main receiver 1105. The processor 1100, as it continues to execute this example embodiment of a message parser 1140, conducts a comparison of an identifier value 1245 to various identifiers included in a received list of service groups. In the event that a successful comparison is achieved, the processor 1100, as it continues to execute this example embodiment of a message parser module 1140, the processor 1100 continues to use the radio frequency to which the main receiver 1105 was previously directed to by the processor 1100 as it executed this example embodiment of a message parser module 1140. This radio frequency is said to be associated with "an identified data source". In the event that a successful comparison is not achieved, the processor 1100 will direct the main receiver 1105 two a different radio frequency and continue the process until the processor 1100 receives a list of service groups that includes an identifier which is substantially equivalent to the identifier 1245 stored in the memory 1115.

In one alternative embodiment, the message processor 1140, when executed by the processor 1100, minimally causes the processor 1100 to recognize a time beacon message, which is received either from the main receiver 1105 or the override receiver 1110. Again, the source of the information is not necessarily relevant from the perspective of the processor 1100 as it executes the message parser module 1140. In response to a time beacon message, the processor 1100, as it continues to further execute the message parser 1140, extracts a time value from the time beacon message and stores the time value into the clock 1102.

As the processor 1100 continues to execute the message parser 1140, the processor 1100 receives (1250, 1255) other forms of information and operating directives. In one alternative example embodiment, the message parser 1140, when executed by the processor 1100, further minimally causes the processor 1100 to recognize including at least one of a geographic-region turn on offset mode directive and a geographic-region turn off offset mode directive. When receiving such operating mode directives, the processor 1100 executes the mode manager 1145. The mode manager 1145, as it is executed by the processor 1100, minimally causes the processor to set a geographic-region turn on offset mode indicator 1150 stored in the memory 1115 when the mode manager 1145 is executed by the processor 1100 and receives 1260 a geographic-region turn on offset mode directive from the message parser 1140. The mode manager 1145, as it is executed by the processor 1100, minimally causes the processor to set a geographic-region turn off offset mode indicator 1155 stored in the memory 1115 when the mode manager 1145 is executed by the processor 1100 and receives 1260 a geographic-region turn off offset mode directive from the message parser 1140.

In yet another example embodiment, the processor 1100, extracts from at least one of a geographic-region turn on offset mode directive and a geographic-region turn off offset mode directive a geographic region type identifier. For example, various types of geographic-regions may be identified in information received from an identified data source. In one example embodiment, the processor 1100 extracts a climate-region type identifier from at least one of a geographic-region turn on offset mode directive and a geographic-region turn off offset mode directive. In the case where the processor 1100, as it executes the mode manager 1145, extracts a geographic-region type identifier from a geographic-region turn on offset mode directive; the processor 1100 stores the extracted geographic-region type identifier in the geographic region turn on offset mode indicator 1150, which is stored in the memory 1115. In the case where the processor 1100, as it executes the mode manager 1145, extracts a geographic-region type identifier from a geographic-region turn off offset mode directive, the processor 1100 stores the extracted geographic-region type identifier in the geographic region turn off offset mode indicator 1150, which is stored in memory 1115. According to one illustrative use case, a geographic-region type identifier may refer to a geographic-region comprising a microclimate region as discussed supra.

In one alternative example embodiment, the message parser 1140, as it is executed by the processor 1100, further minimally causes the processor 1100 to recognize least one of a service group turn on offset mode directive and a service group turn off offset mode directive. When receiving such operating mode directives, the processor 1100 executes the mode manager 1145. The mode manager 1145, as it is executed by the processor 1100, minimally causes the processor to set a service group turn on offset mode indicator 1160 stored in the memory 1115 when the mode manager 1145 is executed by the processor 1100 and receives 1260 a service group turn on offset mode directive from the message parser 1140. The mode manager 1145, as it is executed by the processor 1100, minimally causes the processor to set a service group turn off offset mode indicator 1165 stored in the memory 1115 when the mode manager 1145 is executed by the processor 1100 and receives 1260 a service group turn off offset mode directive from the message parser 1140.

In yet another example embodiment, the processor 1100, extracts from at least one of a service group turn on offset mode directive and a service group turn off offset mode directive a service group type identifier. For example, various types of service groups may be identified in information received from an identified data source. In one example embodiment; the processor 1100 extracts a service group type identifier that corresponds to at least one of a municipal entity, a government entity, a private operator, and a specific luminary group from at least one of a service group turn on offset mode directive and a service group turn off offset mode directive. In the case where the processor 1100, as it executes the mode manager 1145, extracts a service group type identifier from a service group turn on offset mode directive, the processor 1100 stores the extracted service group type identifier in the service group region turn on offset mode indicator 1160, which is stored in the memory 1115. In the case where the processor 1100, as it executes the mode manager 1145, extracts a service group type identifier from a service group turn off offset mode directive, the processor 1100 stores the extracted service group type identifier in the service group turn off offset mode indicator 1165, which is stored in memory 1115.

In one alternative example embodiment, the message parser 1140, when executed by the processor 1100, further minimally causes the processor 1100 to recognize least one of a use prestored turn on offset mode directive and a use prestored turn off offset mode directive. When receiving such operating mode directives, the processor 1100 executes the mode manager 1145. The mode manager 1145, as it is executed by the processor 1100, minimally causes the processor to set a use prestored turn on offset mode indicator 1170 stored in the memory 1115 when the mode manager 1145 is executed by the processor 1100 and receives 1260 a use prestored turn on offset mode directive from the message parser 1140. The mode manager 1145, as it is executed by the processor 1100, minimally causes the processor to set a use prestored turn off offset mode indicator 1175 stored in the memory 1115 when the mode manager 1145 is executed by the processor 1100 and receives 1260 a use prestored turn off offset mode directive from the message parser 1140.

In one alternative example embodiment, the message parser 1140, when executed by the processor 1100, further minimally causes the processor 1100 to recognize least one of a use service group dimming mode directive, a use geographic-region dimming mode directive and a use prestored dimming mode. When receiving such operating mode directives, the processor 1100 executes the mode manager 1145. The mode manager 1145, as it is executed by the processor 1100, minimally causes the processor to set a use service group dimming mode indicator 1190 stored in the memory 1115 when the mode manager 1145 is executed by the processor 1100 and receives 1260 a use service group dimming mode directive from the message parser 1140. The mode manager 1145, as it is executed by the processor 1100, minimally causes the processor to set a use geographic-region dimming mode indicator 1185 stored in the memory 1115 when the mode manager 1145 is executed by the processor 1100 and receives 1260 a use geographic-region dimming offset mode directive from the message parser 1140. The mode manager 1145, as it is executed by the processor 1100, minimally causes the processor to set a use prestored dimming mode indicator 1200 stored in the memory 1115 when the mode manager 1145 is executed by the processor 1100 and receives 1260 a use prestored dimming mode directive from the message parser 1140.

In one example embodiment, the processor 1100 extracts a geographic-region type identifier that corresponds to a particular type of geographic-region, e.g. a micro-climate region. In the case where the processor 1100, as it executes the mode manager 1145, extracts a geographic-region type identifier from a dimming mode directive, the processor 1100 stores the extracted geographic-region type identifier in the geographic-region dimming mode indicator 1185, which is stored in the memory 1115.

In one example embodiment, the processor 1100 extracts a service group type identifier that corresponds to at least one of a municipal entity, a government entity, a private operator, and a specific luminary group from dimming mode directive. In the case where the processor 1100, as it executes the mode manager 1145, extracts a service group type identifier from a dimming mode directive, the processor 1100 stores the extracted service group type identifier in the service group dimming mode indicator 1190, which is stored in the memory 1115.

As the processor 1100 continues to execute the message parser 1140, the message parser 1140 further minimally causes the processor to receive operational information from at least one of the main receiver 1105 and the override receiver 1110. In some cases, the main receiver 1105 is used to receive information that changes on a periodic basis. For example, the main receiver 1105 is typically used to receive information such as a standard turn on time and a standard turn off time. Again this is merely an example embodiment and the claims appended hereto are not intended to be limited in scope with respect to which receiver is used to receive any particular type of information or operational director. For example, standard turn on time and standard turn off time may just as easily be received by means of the override receiver 1110. According to this example embodiment, the message parser 1140, as it is executed by the processor 1100, minimally causes the processor to respond to a standard turn on time message by extracting a standard turn on time value and storing it in a standard turn on time variable 1205, which is stored in the memory 1115. According to yet another example embodiment, the message parser 1140, as it is executed by the processor 1100 minimally causes the processor to respond to a standard turnoff time message by extracting a standard turnoff time value from the message and storing it in a standard turnoff time variable 1210, which is stored in the memory 1115. According to one illustrative use case, a standard turn on time comprises the time of sunset. In yet another illustrative use case, standard turnoff time comprises the time of sunrise.

According to one alternative example embodiment, the message parser 1140, as it is executed by the processor 1100, further minimally causes the processor 1100 to recognize various turn on offset and turn off offset messages. For example, in one alternative illustrative embodiment, the message parser 1140 further minimally causes the processor 1100 to recognize at least one of a geographic-region turn on offset message, a service group turn on offset message, and a prestored turn on offset message. Typically, but not necessarily, the geographic-region turn on offset message and the service group turn on offset message are received by means of the main receiver 1105. Again, in one illustrative application, a geographic-region turn on offset message and a service group turn on offset message typically include offset values that vary over time (e.g. for example on a daily, weekly or monthly basis). Typically, but not necessarily, the prestored turn on offset message includes a turn on offset that is relatively static. Typically such static information is received by means of the override receiver 1110 and such static information is received at a convenient time prior, to contemporaneous with, or after installation of the luminary controller 510 on a luminary fixture 500.

According to one alternative example embodiment, the processor 1100 continues to execute the message parser 1140, the message parser 1140 further minimally causes the processor to discriminate messages received by means of at least one of the main receiver 1105 and the override receiver 1110 in order to select a particular turn on offset message from information transmitted from an identified data source. According to one example embodiment, the message parser 1140 minimally causes the processor 1100 to select a turn on offset message for a particular geographic-region based on the identifier 1245 that is stored in the memory 1115 when the use geographic-region turn on offset mode indicator 1150 is set. In yet another alternative example embodiment, the message parser 1140 minimally causes the processor 1100 to select a turn on offset message for a particular geographic-region based on the identifier 1245 that is stored in the memory 1115 and also based on a type of the geographic-region turn on offset message according to a geographic-region type indicator stored in the geographic-region turn on offset mode indicator 1150. In each particular case, the geographic-region identifier 1245 stored in the memory 1115 refers to at least one of a specific geographic region and to a specific geographic region/geographic region type. Once a turn on offset message for a particular geographic-region is selected, a turn on offset value is extracted from the message and stored in the received turn on offset variable 1225 stored in the memory 1115.

According to one alternative example embodiment, the processor 1100 continues to execute the message parser 1140, the message parser 1140 further minimally causes the processor to discriminate messages received by means of at least one of the main receiver 1105 and the override receiver 1110 in order to select a particular turn off offset message from information transmitted from an identified data source. According to one example embodiment, the message parser 1140 minimally causes the processor 1100 to select a turn off offset message for a particular geographic-region based on the identifier 1245 that is stored in the memory 1115 when the use geographic-region turn off offset mode indicator 1155 is set. In yet another alternative example embodiment, the message parser 1140 minimally causes the processor 1100 to select a turn off offset message for a particular geographic-region based on the identifier 1245 that is stored in the memory 1115 and also based on a type of the geographic-region turn off offset message according to a geographic-region type indicator stored in the geographic-region turn off offset mode indicator 1155. In each particular case, the geographic-region identifier 1245 stored in the memory 1115 refers to at least one of a specific geographic region and to a specific geographic region/geographic region type. Once a turn off offset message for a particular geographic-region is selected, a turn off offset value is extracted from the message and stored in the received turn on offset variable 1230 stored in the memory 1115.

According to one alternative example embodiment, the processor 1100 continues to execute the message parser 1140, the message parser 1140 further minimally causes the processor to discriminate messages received by means of at least one of the main receiver 1105 and the override receiver 1110 in order to select a particular turn on offset message from information transmitted from an identified data source. According to one example embodiment, the message parser 1140 minimally causes the processor 1100 to select a turn on offset message for a particular service group based on the identifier 1245 that is stored in the memory 1115 when the use service group turn on offset mode indicator 1160 is set. In yet another alternative example embodiment, the message parser 1140 minimally causes the processor 1100 to select a turn on offset message for a particular service group based on the identifier 1245 that is stored in the memory 1115 and also based on a type of the service group turn on offset message according to a service group type indicator stored in the service group turn on offset mode indicator 1160. In each particular case, the service group identifier 1245 stored in the memory 1115 refers to at least one of a specific service group and to a specific service group/service group type. Once a turn on offset message for a particular service group is selected, a turn on offset value is extracted from the message and stored in the received turn on offset variable 1230 stored in the memory 1115.

According to one alternative example embodiment, the processor 1100 continues to execute the message parser 1140, the message parser 1140 further minimally causes the processor to discriminate messages received by means of at least one of the main receiver 1105 and the override receiver 1110 in order to select a particular turn off offset message from information transmitted from an identified data source. According to one example embodiment, the message parser 1140 minimally causes the processor 1100 to select a turn off offset message for a particular service group based on the identifier 1245 that is stored in the memory 1115 when the use service group turn off offset mode indicator 1165 is set. In yet another alternative example embodiment, the message parser 1140 minimally causes the processor 1100 to select a turn off offset message for a particular service group based on the identifier 1245 that is stored in the memory 1115 and also based on a type of the service group turn off offset message according to a service group type indicator stored in the service group turn off offset mode indicator 1165. In each particular case, the service group identifier 1245 stored in the memory 1115 refers to at least one of a specific service group and to a specific service group/service group type. Once a turn off offset message for a particular service group is selected, a turn off offset value is extracted from the message and stored in the received turn off offset variable 1230 stored in the memory 1115.

According to one alternative example embodiment, the message parser 1140, as it is executed by the processor 1100, further minimally causes the processor 1100 to recognize various dimming profile messages. For example, in one alternative illustrative embodiment, the message parser 1140 further minimally causes the processor 1100 to recognize at least one of a geographic-region dimming profile message, a service group dimming profile message, and a prestored dimming profile message.

According to one alternative example embodiment, the processor 1100 continues to execute the message parser 1140, the message parser 1140 further minimally causes the processor 1100 to discriminate messages received by means of at least one of the main receiver 1105 and the override receiver 1110 in order to select a particular dimming profile message from information transmitted from an identified data source. According to one example embodiment, the message parser 1140 minimally causes the processor 1100 to select dimming profile message for a particular geographic-region based on the identifier 1245 that is stored in the memory 1115 when the use geographic-region dimming mode indicator 1185 is set. In yet another alternative example embodiment, the message parser 1140 minimally causes the processor 1100 to select dimming profile message for a particular geographic-region based on the identifier 1245 that is stored in the memory 1115 and also based on a type of the geographic-region that a particular message pertains to according to a geographic-region type indicator stored in the geographic-region dimming mode indicator 1185. In each particular case, the geographic-region identifier 1245 stored in the memory 1115 refers to at least one of a specific geographic region and to a specific geographic region/geographic region type. Once a dimming profile message for a particular geographic-region is selected, a dimming profile table is extracted from the message and stored in the received dimming profile variable 1235 stored in the memory 1115.

According to one alternative example embodiment, the processor 1100 continues to execute the message parser 1140, the message parser 1140 further minimally causes the processor 1100 to discriminate messages received by means of at least one of the main receiver 1105 and the override receiver 1110 in order to select a particular dimming profile message from information transmitted from an identified data source. According to one example embodiment, the message parser 1140 minimally causes the processor 1100 to select dimming profile message for a particular service group based on the identifier 1245 that is stored in the memory 1115 when the use service group dimming mode indicator 1190 is set. In yet another alternative example embodiment, the message parser 1140 minimally causes the processor 1100 to select dimming profile message for a particular service group based on the identifier 1245 that is stored in the memory 1115, and also based on a type of the service group that a particular message pertains to according to a service group type indicator stored in the service group dimming mode indicator 1190. In each particular case, the service group identifier 1245 stored in the memory 1115 refers to at least one of a specific service group and to a specific service group/service group type. Once a dimming profile message for a particular service group is selected, a dimming profile table is extracted from the message and stored in the received dimming profile variable 1235 stored in the memory 1115.

According to one example illustrative embodiment, the processor 1100, as it continues to operate, executes the level module 1180, which is stored in the memory 1115. As the processor 1100 executes the level module 1180, the level module 1180 minimally causes the processor to receive a time value from the clock 1102. The level module 1180 causes the processor to receive a time value on a periodic basis. Typically, but not necessarily, the level module 1180 is executed by the processor as an interrupt service routine in response to a clock pulse provided by the clock 1102.

This illustrative embodiment, the level module 1180 further minimally causes the processor 1100 to compare a time value received from the clock 1102 to at least one of a standard turn on time value (stored in the memory 1115 in a standard turn on time variable 1205) and a standard turn off time value (stored in the memory of 1115 and a standard turn off time variable 1210).

In one alternative example embodiment, when the processor 1100, as it continues to execute the level module 1180, determines that the time value received from the clock 1102 is equal to the standard turn on time value (1205), the processor 1100 conveys 1285 a turn on command to the power controller 1120. In one alternative example embodiment, when the processor 1100, as it continues to execute the level module 1180, determines that the time value received from the clock 1102 is equal to or greater than the standard turn on time value (1205), the processor 1100 conveys 1285 a turn on command to the power controller 1120. In one alternative example embodiment, when the processor 1100, as it continues to execute the level module 1180, determines that the time value received from the clock 1102 is greater than the standard turn on time value (1205), the processor 1100 conveys 1285 a turn on command to the power controller 1120.

According to yet another alternative example embodiment, the level module 1180, as it is executed by the processor 1100, further minimally causes the processor 1100 to retrieve at least one of a geographic-region turn on offset mode indicator 1150, a service group turn on offset mode indicator 1160 and a pre-stored turn on offset mode indicator 1170 from the memory 1115. When at least one of the geographic-region turn on offset mode indicator 1150, the service group turn on offset mode indicator 1160 and the pre-stored turn on offset mode indicator 1170 are true (e.g. are set or are used to store an type of geographic region or service group type), then the processor 1100, as it continues to execute the level module 1180, retrieves the standard turn on time 1205 from the memory 1115 and at least one of a received turn on offset 1225 and a prestored turn on offset 1215. The processor 1100 is further minimally caused to add the standard turn on time 1205 to either of the received turn on offset 1225 or the prestored turn on offset 1215 based on the state of the prestored turn on offset mode indicator 1170. It should be appreciated that the prestored turn on offset 1215 is used when the prestored turn on offset mode indicator 1170 is true. The resulting sum is referred to as the determined turn on time.

In one alternative example embodiment, when the processor 1100, as it continues to execute the level module 1180, determines that the time value received from the clock 1102 is equal to the determined turn on time, the processor 1100 conveys 1285 a turn on command to the power controller 1120. In one alternative example embodiment, when the processor 1100, as it continues to execute the level module 1180, determines that the time value received from the clock 1102 is equal to or greater than the determined turn on time, the processor 1100 conveys 1285 a turn on command to the power controller 1120. In one alternative example embodiment, when the processor 1100, as it continues to execute the level module 1180, determines that the time value received from the clock 1102 is greater than the determined turn on time, the processor 1100 conveys 1285 a turn on command to the power controller 1120.

In one alternative example embodiment, when the processor 1100, as it continues to execute the level module 1180, determines that the time value received from the clock 1102 is equal to the standard turn off time value (1210), the processor 1100 conveys 1285 a turn off command to the power controller 1120. In one alternative example embodiment, when the processor 1100, as it continues to execute the level module 1180, determines that the time value received from the clock 1102 is equal to or greater than the standard turn off time value (1210), the processor 1100 conveys 1285 a turn off command to the power controller 1120. In one alternative example embodiment, when the processor 1100, as it continues to execute the level module 1180, determines that the time value received from the clock 1102 is greater than the standard turn off time value (1210), the processor 1100 conveys 1285 a turn on command to the power controller 1120.

According to yet another alternative example embodiment, the level module 1180, as it is executed by the processor 1100, further minimally causes the processor 1100 to retrieve at least one of a geographic-region turn off offset mode indicator 1155, a service group turn off offset mode indicator 1165 and a pre-stored turn off offset mode indicator 1175 from the memory 1115. When at least one of the geographic-region turn off offset mode indicator 1155, the service group turn off offset mode indicator 1165 and the pre-stored turn off offset mode indicator 1175 are true (e.g. are set or are used to store an type of geographic region or service group type), then the processor 1100, as it continues to execute the level module 1180, retrieves the standard turn off time 1210 from the memory 1115 and at least one of a received turn off offset 1230 and a prestored turn off offset 1220. The processor 1100 is further minimally caused to add the standard turn off time 1210 to either of the received turn off offset 1230 or the prestored turn off offset 1220 based on the state of the prestored turn off offset mode indicator 1175. It should be appreciated that the prestored turn off offset 1220 is used when the prestored turn off offset mode indicator 1175 is true. The resulting sum is referred to as the determined turn off time.

In one alternative example embodiment, when the processor 1100, as it continues to execute the level module 1180, determines that the time value received from the clock 1102 is equal to the determined turn off time, the processor 1100 conveys 1285 a turn off command to the power controller 1120. In one alternative example embodiment, when the processor 1100, as it continues to execute the level module 1180, determines that the time value received from the clock 1102 is equal to or greater than the determined turn off time, the processor 1100 conveys 1285 a turn off command to the power controller 1120. In one alternative example embodiment, when the processor 1100, as it continues to execute the level module 1180, determines that the time value received from the clock 1102 is greater than the determined turn off time, the processor 1100 conveys 1285 a turn off command to the power controller 1120.

In yet another alternative example embodiment, the processor 1100, as it continues to execute the level control module 1180, determines if a dimming profile is to be utilized in controlling the luminary based on the state of dimming mode indicators including at least one of a geographic-region dimming mode indicator 1185, a service group dimming mode indicator 1190, and a prestored dimming mode indicator 1200. If any of these dimming mode indicators is true, then a dimming profile is retrieved from memory. In this alternative example embodiment, the processor 1100 retrieves at least one of a received dimming profile 1235 and a prestored dimming profile 1240 from the memory 1115. According to this alternative example embodiment, the processor 1100, as it continues to execute the level module 1180, determines which dimming profile to retrieve from memory based on the state of the prestored dimming mode indicator 1200. In the event that the prestored dimming mode indicator 1200 is true, and the processor 1100, as it continues to execute the level module 1180, will retrieve the prestored dimming profile 1240 from the memory 1115. Otherwise, the processor 1100 will retrieve the received dimming profile 1235 from the memory 1115.

As the processor 1100 continues to execute the level module 1180, it will receive a time value from the clock 1102. The processor 1100 looks to the dimming profile retrieved from the memory 1115. As already described in FIG. 21, a dimming profile includes a time interval field 1060 and a level indicator field 1065. The processor 1100 identifies a record within the dimming profile according to the time value received from the clock 1102 and various time interval definitions stored in the time interval field 1060. When the processor 1100, as it continues to execute the level module 1180, identifies a record within the dimming profile wherein the time interval field 1060 is substantially consistent with the current time value received from the clock 1102, then the processor 1100 retrieves a level indicator from the level field 1065 of the identified record included in the dimming profile retrieved from the memory 1115. Accordingly, the processor 1100 then conveys 1285 a dimming level to the power controller 1120. It should be appreciated that the power controller 1120 comprises according to this alternative example embodiment, a synchronous buck down-converter commensurate with the teachings herein.

In yet another alternative example embodiment, the message parser 1140, as it is executed by the processor 1100, further minimally causes the processor to recognize particular override commands including, but not limited to at least one of a turn on command, a turn off command, and a dim command. Typically, but not necessarily, such override commands are received by means of the override receiver 1110. However in alternative embodiments, override commands are received by the Main receiver 1105. Such override commands are useful in case of exigent circumstances such as law enforcement activities where a dim and luminary needs to be elevated to full power or where a luminary needs to be extinguished in order to cloak law enforcement activities. A dim override command is useful in brownout situations when the load on the power grid needs to be reduced.

When the processor 1100, as a result of its continued execution of one alternative example embodiment of a message parser 1140, recognizes a turn on command, the processor 1100 conveys 1265 a turn on command to the level module 1180. In turn, the level module 1180 when executed by the processor 1100 conveys a turn on message to the power controller 1120. This results in application of full power to the luminary lighting element 1130. When the processor 1100, as a result of its continued execution of one alternative example embodiment of a message parser 1140, recognizes a turn off command, the processor 1100 conveys 265 he turn off command to the level module 1180. In turn, the level module 1180, when executed by the processor 1100, conveys a turn off message to the power controller 1120. This results in depriving the luminary lighting element 1130 of electrical power. In yet another alternative example embodiment of a message parser 1140, the processor 1100, as it continues to execute this alternative example embodiment of a message parser 1140, recognizes a dim command. When the processor 1100 recognizes a dim command, the processor 1100 directs the level module 1180 to reduce the amount of power applied to the luminary lighting element 1130. As a result, the level module 1180 will convey 1285 a light level command to the power controller 1120 commensurate with the recognized dim command.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. An apparatus for reducing the amplitude of voltage provided by an alternating current power source comprising:
an input terminal for receiving an alternating current from a power source;
a common terminal for receiving an alternating current from at least one of a neutral conductor and a return current from a load;
a bi-directional buck switch comprising a first port for receiving the alternating current received by means of the input terminal and a second port for distributing the alternating current when the bi-directional buck switch is on;
a bi-directional freewheel switch comprising a first port for receiving the alternating current received by means of the common terminal and a second port for distributing the alternating current when the bi-directional freewheel switch is on;
a buck inductor comprising a first port for receiving the alternating current distributed by at least one of the bi-directional buck switch and the bi-directional freewheel switch said buck inductor further comprising a second port for distributing the alternating current received by the first port of said inductor;
an output terminal for conveying the alternating current distributed by the inductor to the load;
a current sensor disposed so as to generate a direction signal according to the direction of current flow in the inductor; and
a power controller for controlling in a complimentary manner according to a duty factor and according to the direction signal the bi-directional buck switch and the bi-directional freewheel switch by
partially disabling the freewheel switch so as to allow current flow substantially in one direction then waiting a period of time and then
partially enabling the buck switch so as to allow current flow substantially in one direction then waiting a period of time and then
disabling the freewheel switch so as to substantially prevent the flow of current through said freewheel switch then waiting a period of time and then enabling the buck switch so as to substantially allow current to flow in both directions.

2. The apparatus of claim 1 further comprising:
a three blade plug for interfacing the input terminal, the output terminal, and the neutral terminal to a luminary fixture.

3. The apparatus of claim 2 further comprising a receiver for receiving a duty factor and a dimming controller that conveys the duty factor to the power controller.

4. The apparatus of claim 3 wherein the dimming controller comprises a state machine.

5. The apparatus of claim 3 wherein the dimming controller comprises:
processor;
memory for storing instruction sequences and information; and
instruction sequences stored in the memory including:
a message parser that, when executed by the processor, minimally causes the processor to receive the duty factor from the receiver; and
a dimming module that conveys the duty factor to the power controller.

6. A system for dimming luminaries comprising:
a transmitter for broadcasting dimming information;
a three terminal luminary dimmer unit comprising:
an input terminal for receiving an alternating current from a power source;
a common terminal for receiving an alternating current from at least one of a neutral conductor and a return current from a load;
a bi-directional buck switch comprising a first port for receiving the alternating current received by means of the input terminal and a second port for distributing the alternating current when the bi-directional buck switch is on;
a bi-directional freewheel switch comprising a first port for receiving the alternating current received by means of the common terminal and a second port for distributing the alternating current when the bi-directional freewheel switch is on;
a buck inductor comprising a first port for receiving the alternating current distributed by at least one of the bi-directional buck switch and the bi-directional freewheel switch said buck inductor further comprising a second port for distributing alternating current received by the first port of said inductor;
an output terminal for conveying the alternating current distributed by the inductor to a load; and
a current sensor disposed so as to generate a direction signal according to the direction of current flow in the inductor;
a power controller for controlling in a complimentary manner according to a duty factor and according to the direction signal the bi-directional buck switch and the bi-directional freewheel switch by
partially disabling the freewheel switch so as to allow current flow substantially in one direction then waiting a period of time and then
partially enabling the buck switch so as to allow current flow substantially in one direction then waiting a period of time and then disabling the freewheel switch so as to substantially prevent the flow of current through said freewheel switch then waiting a period of time and
then enabling the buck switch so as to substantially allow current to flow in both directions.

* * * * *